United States Patent
Ivy et al.

(10) Patent No.: US 10,252,447 B2
(45) Date of Patent: *Apr. 9, 2019

(54) METHODS AND SYSTEMS FOR CURING MATERIALS WITHIN CAVITIES

(71) Applicant: The Boeing Company, Chicago, IL (US)

(72) Inventors: William R. Ivy, Charleston, SC (US); Christopher R. Avery, Charleston, SC (US); Seth A. Berger, Summerville, SC (US)

(73) Assignee: The Boeing Company, Chicago, IL (US)

( * ) Notice: Subject to any disclaimer, the term of this patent is extended or adjusted under 35 U.S.C. 154(b) by 336 days.

This patent is subject to a terminal disclaimer.

(21) Appl. No.: 15/142,693

(22) Filed: Apr. 29, 2016

(65) Prior Publication Data

US 2017/0312943 A1    Nov. 2, 2017

(51) Int. Cl.
*B29C 35/02*    (2006.01)
*B29C 35/16*    (2006.01)
(Continued)

(52) U.S. Cl.
CPC ...... *B29C 35/0266* (2013.01); *B29C 35/0272* (2013.01); *B29C 35/0288* (2013.01);
(Continued)

(58) Field of Classification Search
CPC .............. B29C 35/002; B29C 35/0266; B29C 35/0272; B29C 35/0288; B29C 35/16;
(Continued)

(56) References Cited

U.S. PATENT DOCUMENTS 4,480,949 A * 11/1984 Van De Bogart ......... B23C 5/10
                                                              407/54
4,545,837 A * 10/1985 Wehnert ................ B29C 70/347
                                                              156/191

(Continued)

FOREIGN PATENT DOCUMENTS

DE        2433790 A1    1/1976
EP        1172192 A2    1/2002

OTHER PUBLICATIONS

Ivy, William R. et al., Methods and Systems for Curing Materials Within Cavities, U.S. Appl. No. 15/142,711, filed Apr. 29, 2016, 58 pgs.

(Continued)

*Primary Examiner* — Michael A Tolin
(74) *Attorney, Agent, or Firm* — Kwan & Olynick LLP

(57) ABSTRACT

Provided are methods for heat curing of various materials, such as heat curable materials or more specifically potting compounds, which are disposed within cavities with limited access to these materials. Also provided are curing for executing such methods. In some embodiments, a heat curable material disposed within a cavity may be heated by a heating rod protruding into the cavity or through the cavity. The heating rod is thermally coupled to the heat curable material and is used to transfer heat to the heat curable material. For example, the heating rod may include a resistive heating element. The heating element may be positioned in such a way that the heat curable material is selectively heated within the cavity without significant heating of surrounding components. In some embodiments, the heating rod may be also used to compress the part containing the cavity or a stack including this part.

20 Claims, 25 Drawing Sheets

(51) Int. Cl.
  *B29C 65/20* (2006.01)
  *B29C 65/30* (2006.01)
  *B29C 73/34* (2006.01)
  *B64F 5/40* (2017.01)
  *B29C 73/02* (2006.01)
  *B29C 65/00* (2006.01)
  *B29C 70/74* (2006.01)
  *B29K 101/10* (2006.01)
  *B29L 31/30* (2006.01)

(52) U.S. Cl.
  CPC .............. *B29C 35/16* (2013.01); *B29C 65/20* (2013.01); *B29C 65/30* (2013.01); *B29C 66/5324* (2013.01); *B29C 66/91221* (2013.01); *B29C 70/74* (2013.01); *B29C 73/02* (2013.01); *B29C 73/34* (2013.01); *B64F 5/40* (2017.01); *B29K 2101/10* (2013.01); *B29L 2031/3082* (2013.01)

(58) Field of Classification Search
  CPC ........... B29C 2035/0211; B29C 65/022; B29C 65/18; B29C 65/20; B29C 65/30; B29C 66/5324; B29C 66/53245; B29C 66/91221; B29C 66/91231; B29C 66/91411; B29C 66/91421; B29C 66/91431; B29C 66/961; B29C 70/74; B29C 70/745; B29C 70/84; B29C 73/02; B29C 73/30; B29C 73/34; B29L 2031/04; B29L 2031/045; B29L 2031/3076; B29L 2031/3082; B29K 2101/10; B64F 5/40
  See application file for complete search history.

(56) References Cited

U.S. PATENT DOCUMENTS

| | | | |
|---|---|---|---|
| 4,788,413 A | | 11/1988 | Eng |
| 4,867,822 A | * | 9/1989 | Bannink, Jr. ....... B29C 37/0003 156/153 |
| 5,442,156 A | * | 8/1995 | Westerman ............... H05B 3/00 219/243 |
| 6,084,206 A | | 7/2000 | Williamson et al. |
| 6,118,108 A | * | 9/2000 | Ufford .................... B29C 65/18 156/294 |
| 9,277,594 B2 | | 3/2016 | Matsen et al. |
| 2006/0027308 A1 | | 2/2006 | Mackenzie |
| 2006/0074159 A1 | * | 4/2006 | Lu ........................... B28B 7/384 524/188 |
| 2011/0287190 A1 | | 11/2011 | Bulluck |
| 2014/0290831 A1 | * | 10/2014 | Hatano ................... B29C 73/10 156/94 |
| 2017/0312944 A1 | | 11/2017 | Ivy et al. |

OTHER PUBLICATIONS

"U.S. Appl. No. 15/142,711, Restriction Requirement dated Jun. 4, 2018", 7 pgs.

* cited by examiner

METHODS AND SYSTEMS FOR CURING MATERIALS WITHIN CAVITIES

BACKGROUND

Curing heat curable materials disposed within cavities, such as potting compounds within aerospace panels, can be challenging. The curing process often involves heating various surrounding components and/or disassembly and subsequent reassembly of the components. For example, a heat curable material may be disposed within a cavity of an internal component stacked between two external components. In order to cure this heat curable material, at least one of the external components may be heated using an external heater, such as a heat blanket. This approach relies on the heat transfer through the external component to the heat curable material. Otherwise, the external component does not need to be heated. Often, it may not be desirable to heat this external component, e.g., when the component may deteriorate during curing. Furthermore, this external heating approach may be slow, require lots of heating energy, and involve heating of at least one other component (often many other components are heated as well) besides the heat curable material.

In some instances, heat transfer characteristics of other heated components may interfere with the heat transfer. For example, components with good heat transfer characteristics may cause heat dissipation and may actually transfer heat away from the heat curable material. This may cause undesirable heating of other components and/or insufficient curing of the heat curable material. Furthermore, various heated components may operate as heat sinks requiring additional heating energy thereby increasing the overall processing time, energy, and reducing processing efficiency in comparison to direct heating of the heat curable material described herein. On the other side, components with poor heat transfer characteristics may act as heat transfer barriers and blocking the heat transfer to the heat curable material.

Furthermore, heating of the other components may be undesirable in some instances. For example, these components may be made from heat sensitive materials and may change their characteristics (e.g., melt, or change the desire heat treat properties, or change various properties of thermoplastic or thermoset laminates by subsequent reheating after being previously cured) while attempting to cure the heat curable material. Overall, more efficient means of curing heat curable materials disposed within cavities are needed.

SUMMARY

Provided are methods for heat curing of various materials, such as heat curable materials or, more specifically, potting compounds, disposed within cavities of various parts with limited access to these materials. Also provided are curing systems for performing such methods. The curing is performed by internal heating and, in some embodiments, by direct heating of the heat curable material. For example, a heat curable material may be disposed within a cavity of a part and heated by a heating rod protruding into the same or even through the cavity. The part may be a honeycomb or some other similar structure. At least a portion of the heating rod is thermally coupled to the heat curable material, and this portion is used to transfer the heat to the heat curable material thereby curing the heat curable material. A heating element of the heating rod may be positioned in such a way that the heat curable material is selectively heated within the cavity without significant heating of other surrounding components. In some embodiments, the heating rod may also compress the part containing the heat curable material within the cavity or a stack including this part. Furthermore, the heating rod may include a phase change material for controlling the temperature of the heat curable material.

In some embodiments, a method of curing a heat curable material within a cavity of a first part comprises thermally coupling a heating rod and the heat curable material disposed within the cavity and transferring heat from the heating rod to the heat curable material while the heat curable material is disposed within the cavity and thermally coupled to the heating rod. Transferring the heat from heating rod to the heat curable material may cure the heat curable material. Thermally coupling the heating rod and the heat curable material may comprise inserting a heating rod into the cavity and applying the heat curable material into the cavity. In other words, after inserting the heating rod and applying the heat curable material, the heat curable material may be thermally coupled to at least a portion of the heating rod within the cavity.

The heating rod may be inserted into the cavity prior to applying the heat curable material into the cavity. Alternatively, the heating rod may be inserted into the cavity after applying the heat curable material into the cavity. Furthermore, the heating rod may be inserted into the cavity while applying the heat curable material into the cavity. For example, the heat curable material may be disposed on or around the heating rod prior to inserting the heating rod into the cavity. When the heating rod is inserted into the cavity, the heating rod carries the heat curable material onto the cavity.

In some embodiments, transferring the heat to the heat curable material comprises heating at least the portion of the heating rod, which is thermally coupled to the heat curable material. For example, this heating may be resistive heating and may involve applying a voltage to a resistive heating element disposed within the heating rod. In some embodiments, transferring the heat to the heat curable material is performed while monitoring the temperature of the heat curable material. This monitoring may be performed using the heating rod or, more specifically, a thermocouple of the heating rod. In some embodiments, the temperature feedback may be used to change the amount of heat transferred to the heat curable material, e.g., by changing the voltage applied to the resistive heating element. In some embodiments, an additional portion of the heating rod is not heated. This additional portion is not thermally coupled to the heat curable material. In some embodiments, the additional portion of the heating rod is cooled.

In some embodiments, the method further comprises cooling a portion of the first part or a portion of a second part stacked with the first part while transferring the heat to the heat curable material. Cooling the portion of the first part or the portion of the second part stacked with the first part is performed while transferring the heat to the heat curable material is performed using the heating rod.

In some embodiments, the heating rod comprises a phase change material. In these embodiments, transferring the heat to the heat curable material may involve changing the phase of the phase changing material thereby controlling the temperature of the heat curable material. For example, the heat curable material may be cured at the phase change temperature of the phase changing material.

In some embodiments, the heat curable material is sealed within the cavity of the first part while heating at least the portion of the heating rod thermally coupled to the heat curable material. The heat curable material may directly interface the heating rod while transferring the heat to the heat curable material. More specifically, the heat curable material may directly interface the coating or the sleeve of the heating rod. In this example, the coating or the sleeve may be releasable or non-stick relative to the heat curable material.

In some embodiments, the heating rod comprises a heating element and an enclosure enclosing the heating element. The heating rod may also comprise a coating disposed on the enclosure. The coating and the enclosure may be made from different materials. The coating may help with removal of the heating rod after the heat curable material cures. For example, the coating may not stick to the heat curable material. In some embodiments, the coating may have a coefficient of thermal expansion greater than that of the heat curable material, when this material is cured.

In some embodiments, the heating rod further comprises a sleeve disposed over the enclosure. The enclosure and the sleeve comprises different materials. The sleeve may be used in addition to or instead of the coating. In some embodiments, the sleeve is removable from the enclosure, which may help with removal of the heating rod from the cavity after the heat curable material is cured. Specifically, the sleeve may be retained within the cavity after the heating rod is removed from the cavity. In these embodiments, the method may further comprise removing the sleeve from the cavity. Alternatively, the sleeve may be retained in the cavity and may be become a part of an assembly together with the first part. The sleeve may comprise a polymer. More specifically, the polymer of the sleeve may be a fluorinated polymer.

In some embodiments, the heating element of the heating rod is connected to a first electrical lead and a second electrical lead. The first electrical lead and the second electrical lead may be used, for example, to supply an electrical power to the heating element of the heating rod. The first electrical lead may extend from the first end of the enclosure, while the second electrical lead may extend from the second end of the enclosure different from the first end. This type of the heating rod may protrude through the first part. Alternatively, the first electrical lead and the second electrical lead may both extend from a first end of the enclosure. This type of the heating rod may be used for blind holes.

In some embodiments, the heating element extends less than 75% of the length of the enclosure or even less than 50% of the length. This feature may be used for selective heating of the heat curable material. The remaining portion of the enclosure may remain unheated or may include a cooling element.

In some embodiments, the heating rod protrudes through the first part. This approach may be used to apply compressive force on the first part using the heating rod. Furthermore, the heating rod may protrude through a second part stacked together with the first part. In this example, the two parts may be compressed together by the heating rod. In some embodiments, a portion the heating rod protruding through the second part does not generate heat, while transferring heat from heating rod to the heat curable material.

In some embodiments, the first part is porous. The second part may contain (e.g., seal) the heat curable material within the boundary of the first part such that the heat curable material does not squeeze out beyond that boundary until it this material is cured. For example, the first part may have a honeycomb structure, and the cavity may be a pore in the honeycomb structure.

In some embodiments, the method further comprises positioning a bushing over the heating road. The bushing may be adhered to the first part by the heat curable material. The bushing may be positioned over the heating road prior to inserting the heating rod into the cavity. Alternatively, the bushing may be positioned over the heating road after inserting the heating rod into the cavity.

In some embodiments, the cavity of the first part is a through hole. In this example, the heating rod may completely protrude through the cavity and extend outside of the first part on the opposite sides of the first part. Alternatively, the cavity of the first part may be a blind hole. In this example, the heating rod may protrude into the cavity without extending through the first part.

The heat curable material is selected from the group consisting of a potting compound and an adhesive. The first part may be a composite material, such as E-glass composite or any other forms of graphite/carbon fiber composites.

The heat curable material may be heated to between about 150° F. and 250° F. while being cured within the cavity or, more specifically, to between about 175° F. and 2.25° F. This temperature may be selected based on the heat curable material. In some embodiments, the temperature of the heat curable material is maintained substantially constant during most (e.g., greater than 50%) of the heating duration.

In some embodiments, the method further comprises cooling a portion of the first part or a portion of a second part stacked with the first part while transferring heat to the heat curable material. This cooling may be used to ensure that other components near the heat curable material remain at the lower temperature than, for example, the temperature needed for curing the heat curable material. The cooling may be performed using a portion of the heating rod.

In some embodiments, the method further comprises removing the heating rod from the cavity after the heat curable material is cured. After removing the heating rod from the cavity, the method may comprise installing a fastener into the cavity of the first part after removing the heating rod from the cavity. In some embodiments, the method further comprises forming the cavity in the first part.

Also provided is another example of a method of curing a heat curable material within a cavity of a first part. In this example, the method comprises thermally coupling a heating rod and the heat curable material disposed within the cavity and changing a phase of a phase change material disposed within the cavity. Changing the phase of the phase change material may be performed at a curing temperature of the heat curable material. Furthermore, changing the phase of the phase change material disposed within the cavity is a part of transferring heat from the heating rod to the heat curable material while the heat curable material is disposed within the cavity. As noted above, transferring the heat from the heating rod to the heat curable material may cure the heat curable material. Furthermore, as noted above, thermal coupling of the heating rod and the heat curable material disposed within the cavity may comprises inserting the heating rod into the cavity and applying the heat curable material into the cavity. Various other aspects of this example are also described above.

In some embodiments, a curing system comprises a heating rod, a first support, and a second support. The heating rod may comprise a heating element, an enclosure enclosing the heating element, a first electrical lead connected to the heating element, and a second electrical lead connected to the heating element. The first support engages the enclosure of the heating rod. The second support engages the enclosure of the heating rod. The second support is movable between a first end and a second end of the heating rod while continuously engaging the enclosure of the heating rod.

The heating element of the heating rod is a resistive heating element. In some embodiments, the curing system also comprises a thermocouple for measuring the temperature of the enclosure. The curing system may also comprise a system controller for controlling the electrical power supplied to the heating element of the heating rod.

In some embodiments, the heating rod also comprises a sleeve disposed over the enclosure. The enclosure and the sleeve comprise different materials. For example, the sleeve may comprise a polymer, such as a fluorinated polymer. The sleeve may be removable. In some embodiments, the heating rod may comprise a coating disposed on the enclosure. The enclosure and the coating comprise different materials.

In some embodiments, the first electrical lead extends from the first end of the enclosure, while the second electrical lead extends from the second end of the enclosure different from the first end. Alternatively, the first electrical lead and the second electrical lead both extend from the same end, e.g., the first end, of the enclosure.

The heating element may extend less than 75% of a length of the enclosure or, more specifically, less than less than 50% of the length.

These and other embodiments are described further below with reference to the figures.

DETAILED DESCRIPTION

Figure 1:
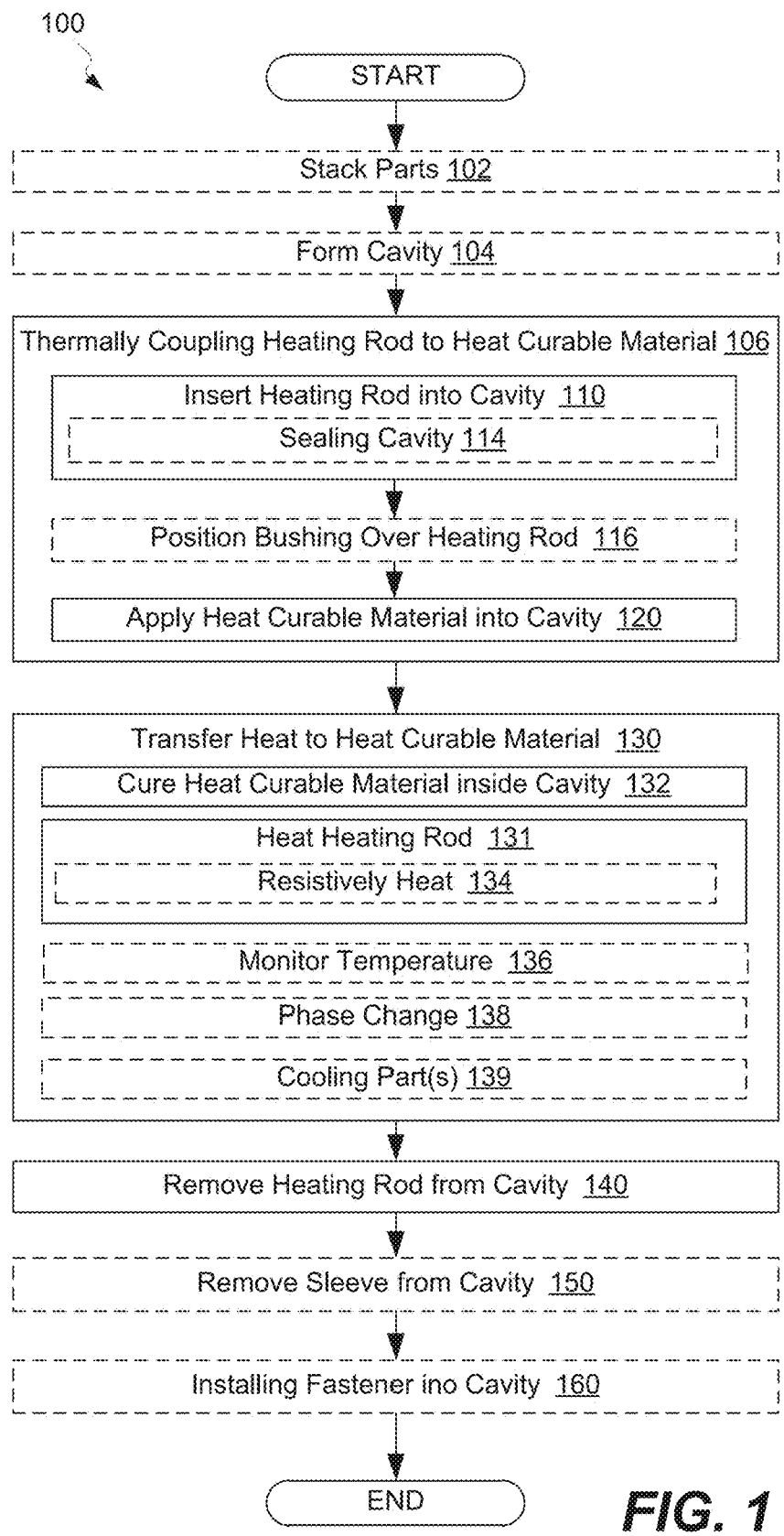
FIG. 1 is a process flowchart corresponding to a method of curing a heat curable material within a cavity of a part, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Curing of various heat curable materials, such as potting compounds, adhesives, and the like, is important for many applications. Some examples of these applications include, but are not limited, to structural/non-structural composite/metallic hole repairs, sandwich panel manufacturing/repair, curing of potting compounds in aerospace structures and other like applications. Often, heat curable materials are disposed in hard to reach places, such as within deep and narrow cavities and/or in cavities of components disposed below other components. As explained above, external heating of these assemblies may result in heating of surrounding parts, which may be undesirable because of the processing time, material limitations, and other reasons described above.

Provided are methods and systems for curing various materials disposed within cavities and/or other like locations with limited access. Curing is achieved by internal heating and, in some embodiments, direct heating of these materials by positioning a heat source, such as a heating rod right into the cavity. The internal heating approach have many advantaged over conventional external heating including faster processing, lower heating energy consumption, reduced heating of other components, and the like.

In some embodiments, a cavity may be formed within a part covered by other parts, such as a cavity formed within an inner part stacked between outer parts. For example, a cavity can be a void in a sandwich panel core (e.g., a honeycomb core), formed during fabrication or during repair. The sandwich panel core may have external panels that may be solid while the internal panel may be porous (e.g., contain voids).

A method may involve thermally coupling a heating rod and the heat curable material disposed within the cavity, for example, by inserting a heating rod into a cavity and applying the heat curable material into the cavity. The heating rod and the heat curable material are thermally coupled within the cavity. In some embodiments, the heat curable material is a potting compound. However, other types of heat curable materials are also within the scope. The method then proceeds with transferring heat from the heating rod to the heat curable material, which may result in curing of the heat curable material. This heat transfer may involve heating the heating rod and, in some embodiments, changing the phase of a phase changing material. For example, the heating rod may include a resistive heating element, and the method may involve passing an electrical current through this heating element. In the same or another example, the heating rod may include the phase changing material, which has a phase changing temperature corresponding to the curing temperature of the heat curable material.

The position and the design of the heating rod may be such that the heat is transferred predominantly to the heat curable material. For example, more than 50% of the heat generated by the heating rod may be transferred to the heat curable material. This approach may be referred to as direct heating or localized heating of the heat curable material. One having ordinary skills in the art would understand that the heat transferred to the heat curable material may then dissipate from the heat curable material to other surrounding parts. However, this approach causes less heating of the surrounding parts than, for example, conventional external heating, i.e., when these parts are used to carry heat to the heat curable material.

The greater portion of the heat transferred to the heat curable material is due to the fact that the heating rod is thermally coupled to the heat curable material more directly. This may be also referred to as primary heating and/or direct heating of the heat curable material. Only some limited heating, which may be referred to secondarily heating, of structures surrounding the heat curable material occurs in this process. In other words, the heat may be still transferred to one or more parts forming the cavity containing the heat curable material. This heat distribution approach is clearly different from conventional external heating methods. Overall, in the described methods and systems, the heat is supplied where it is actually needed and heating of other components is reduced making the overall process more efficient, faster, and less damaging to surrounding components.

In some embodiments, cooling may be provided to one or more parts surrounding the heat curable material to minimize heat distribution beyond the heat curable material. The cooling may be provided externally or internally. For example, a cooling element may be thermally coupled to one or more external surfaces of the parts. In the same or other examples, the heating rod may be used for cooling. It should be noted that this cooling provided by the heating rod is in addition to heating. For example, a cooling mechanism may be positioned within the enclosure of the heating rod. Alternatively, the heating rod may be used for heat transfer and may be thermally coupled to the externally mounted cooling element.

In some embodiments, the heat curable material may be disposed within a laminate having a thickness of at least about 0.25 inches or even at least about 0.5 inches. Without being restricted to any particular theory, it is believed that at such large thicknesses, conventional external heating becomes ineffective. Furthermore, in some embodiments, the access to the heat curable material may be limited to only one side of the laminate. For example, the cavity containing the heat curable material may be a blind hole or the laminate may be positioned on another structure (e.g., a laminate may be an interior panel of an aircraft attached to the exterior panel). Some specific examples of laminates include, but are not limited to, aircraft interior panels and aircraft nacelle panels. The core of the laminate may be potted where a through fastener installation is desired as further described below. In other words, the cured material is later used to provide support within various type of laminates, in particular, laminates with porous inner structures, which become more popular in aircraft and other applications because of their light weight.

Overall, the described methods and system may be used for curing of various heat curable materials by supplying heat internally within cavities and, in some embodiments, directly to these materials. This approach improves processing speeds, eliminates excessive heating of surrounding parts, and allows for more precise control of the curing process (e.g., curing temperatures and/or curing durations) in comparison to conventional external heating. Furthermore, this approach eliminates the need to disassemble stacks of multiple parts to gain access to the heat curable materials disposed within the stacks. Various aspects of these methods and systems will now be described in more details with reference to particular figures.

Processing Examples

FIG. 1 is a process flowchart of method 100 of curing heat curable material 250 disposed within cavity 212 of first part 210, in accordance with some embodiments. Some examples of first part 210 may be selected from group consisting of a laminate structure (e.g., a laminate structure within a porous inner core), a carbon fiber reinforced polymer, and honeycomb structure. One having ordinary skill in the art would understand that many types of structures are also within the scope.

Figure 2A:
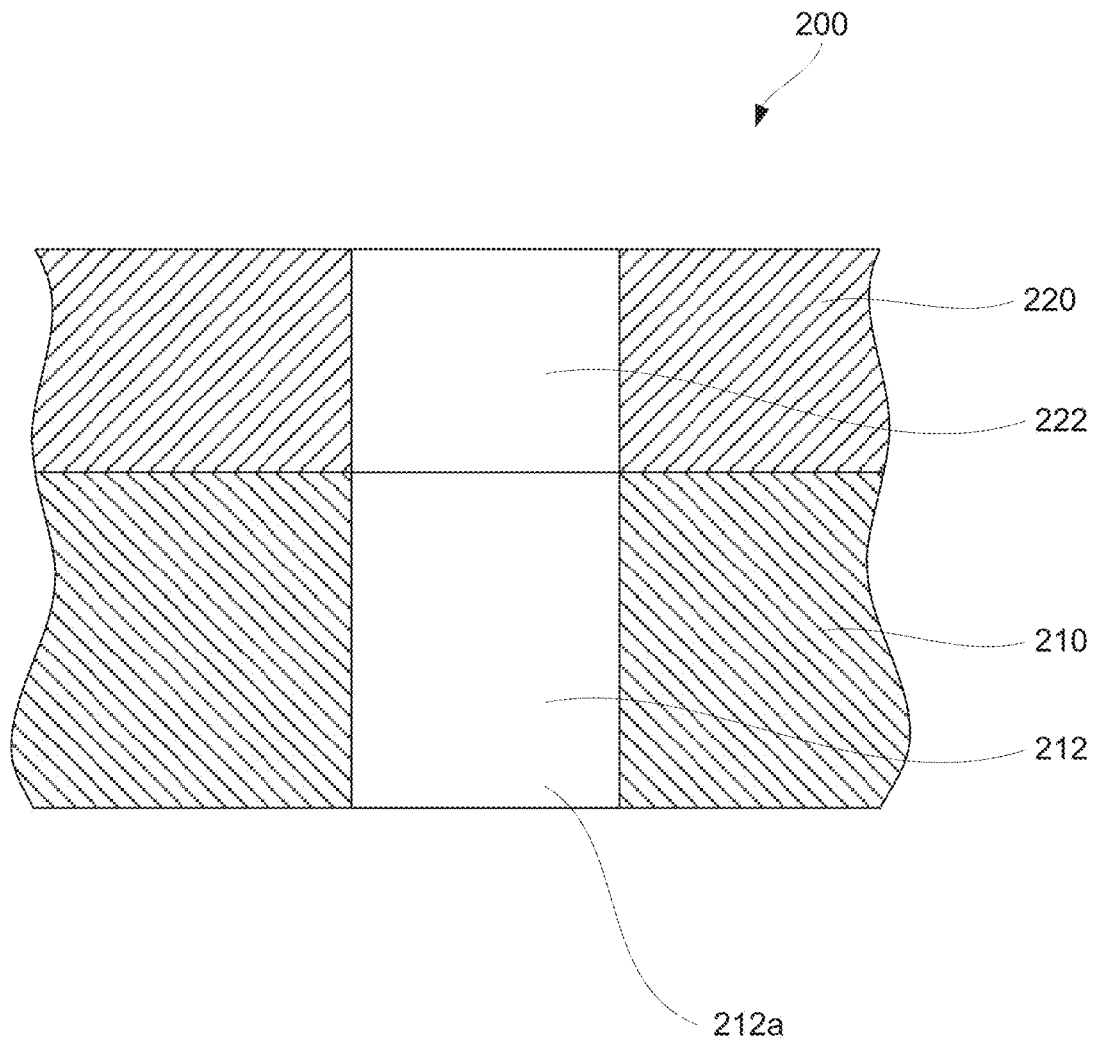
FIG. 2A is a schematic cross-sectional view of a stack of two parts both having cavities, in accordance with some embodiments.

Method 100 may commence with stacking first part 210 with one or more other parts during optional operation 102. For example, first part 210 may be stacked with second part 220 as shown in FIG. 2A. First part 210 may be a carbon fiber reinforced polymer part, while second part 220 may be a metal part or, more specifically, a titanium part.

Figure 3A:
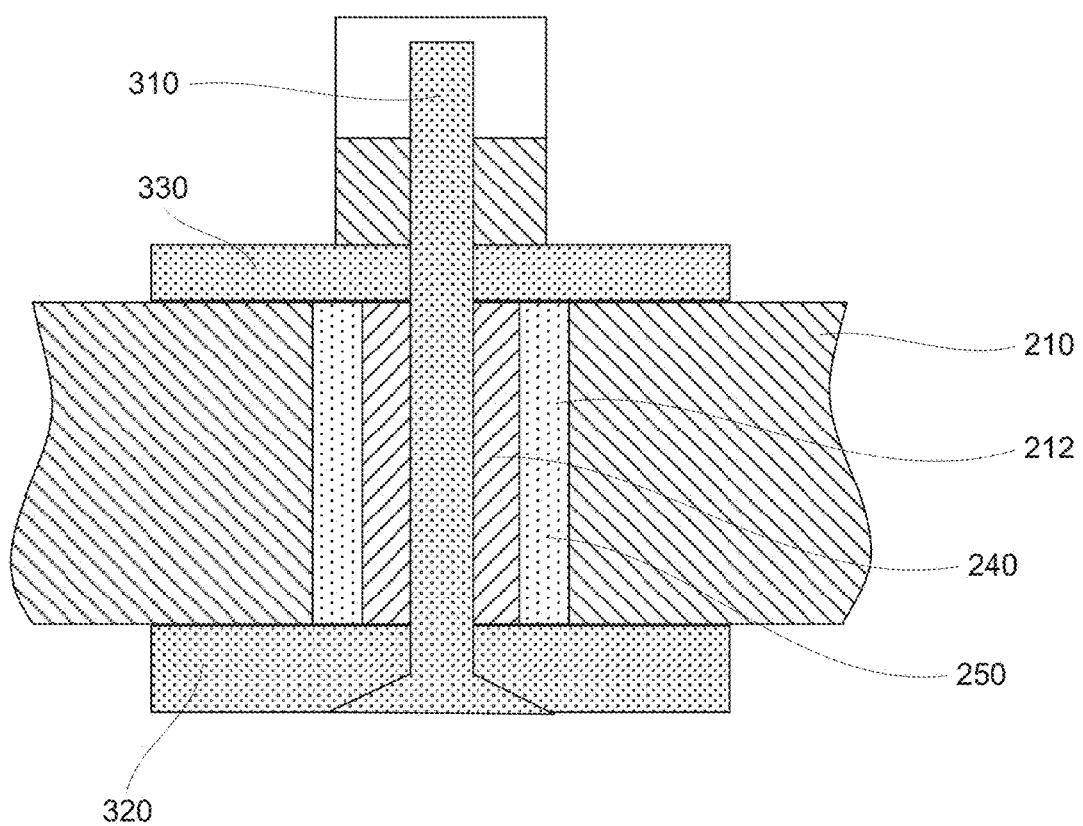
FIG. 3A is a schematic cross-sectional view of a part with a heating rod protruding through a cavity of the part and thermally coupled to a heat curable material disposed within the cavity, in accordance with some embodiments.
Figure 3B:
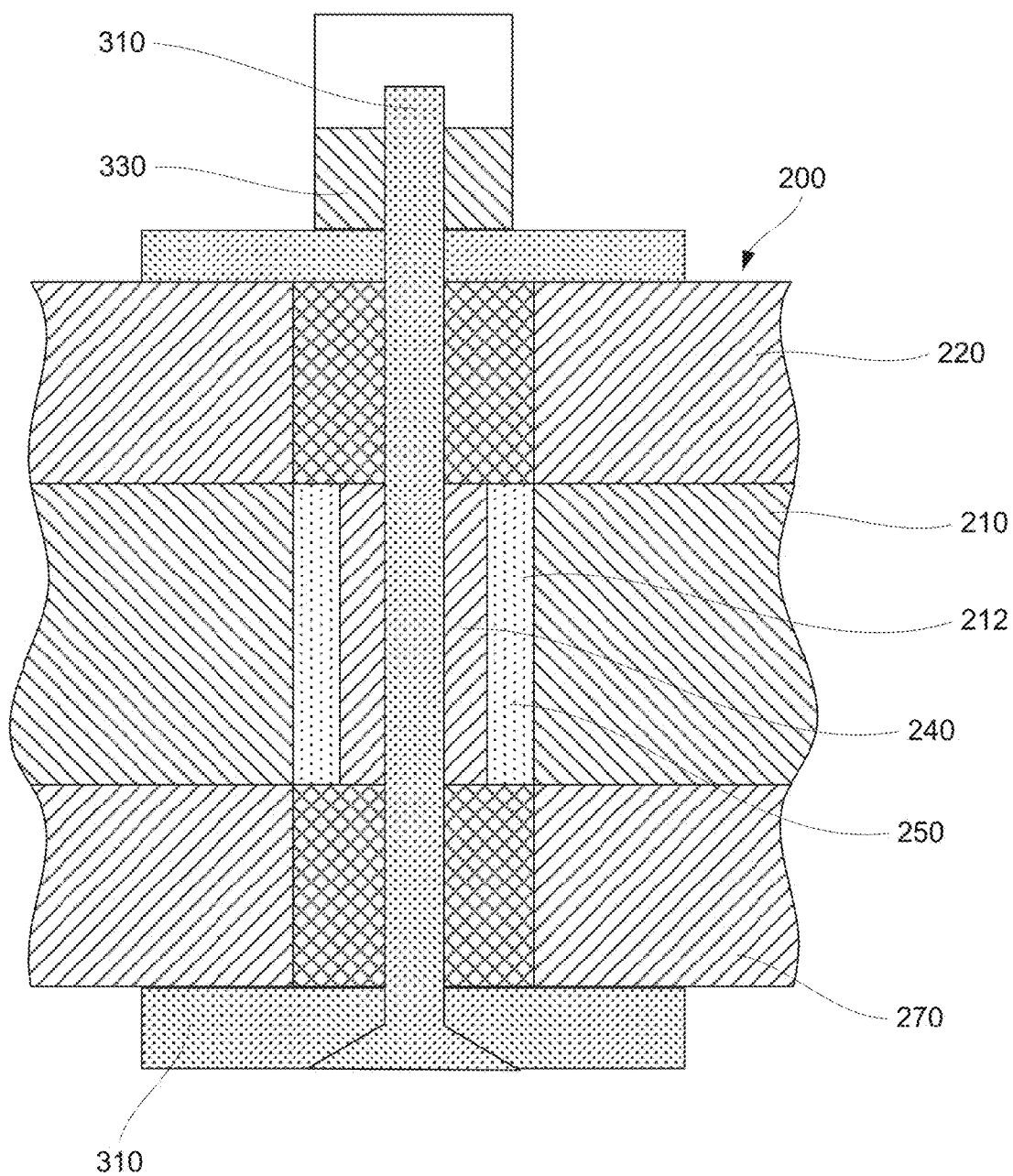
FIG. 3B is a schematic cross-sectional view of a stack of three parts with a heating rod protruding trough all three parts and thermally coupled to a heat curable material disposed within a cavity of the middle part, in accordance with some embodiments.

In some embodiments, stack 200 may include three or more parts, as for example, shown in FIG. 3B. For example, first part 210 may be a carbon fiber reinforced polymer part, while second part 220 may be a metal part and third part 270 may be another metal part. In this example, cavity 212 receiving heat curable material 250 may be provided in first part 210 disposed between second part 220 and third part 270.

Figure 3C:
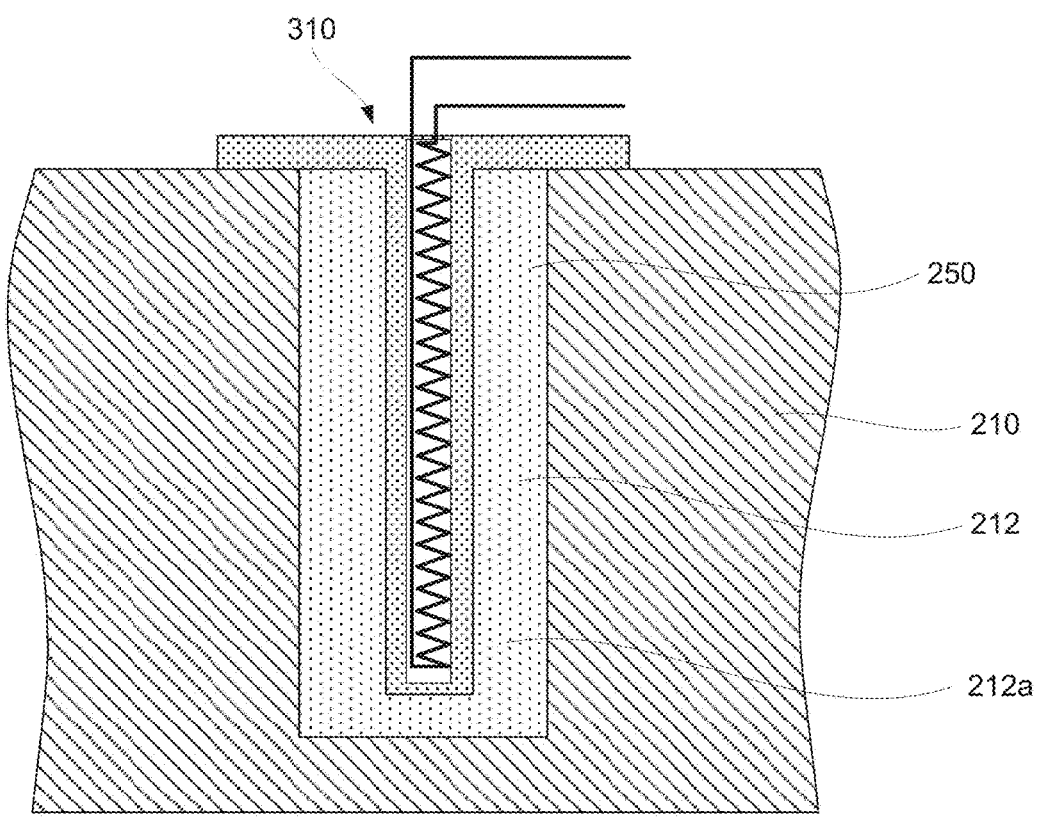
FIG. 3C is a schematic cross-sectional view of a part having a blind cavity with a heat curable material disposed in this cavity and a heating rod extending into that cavity, in accordance with some embodiments.
Figure 3D:
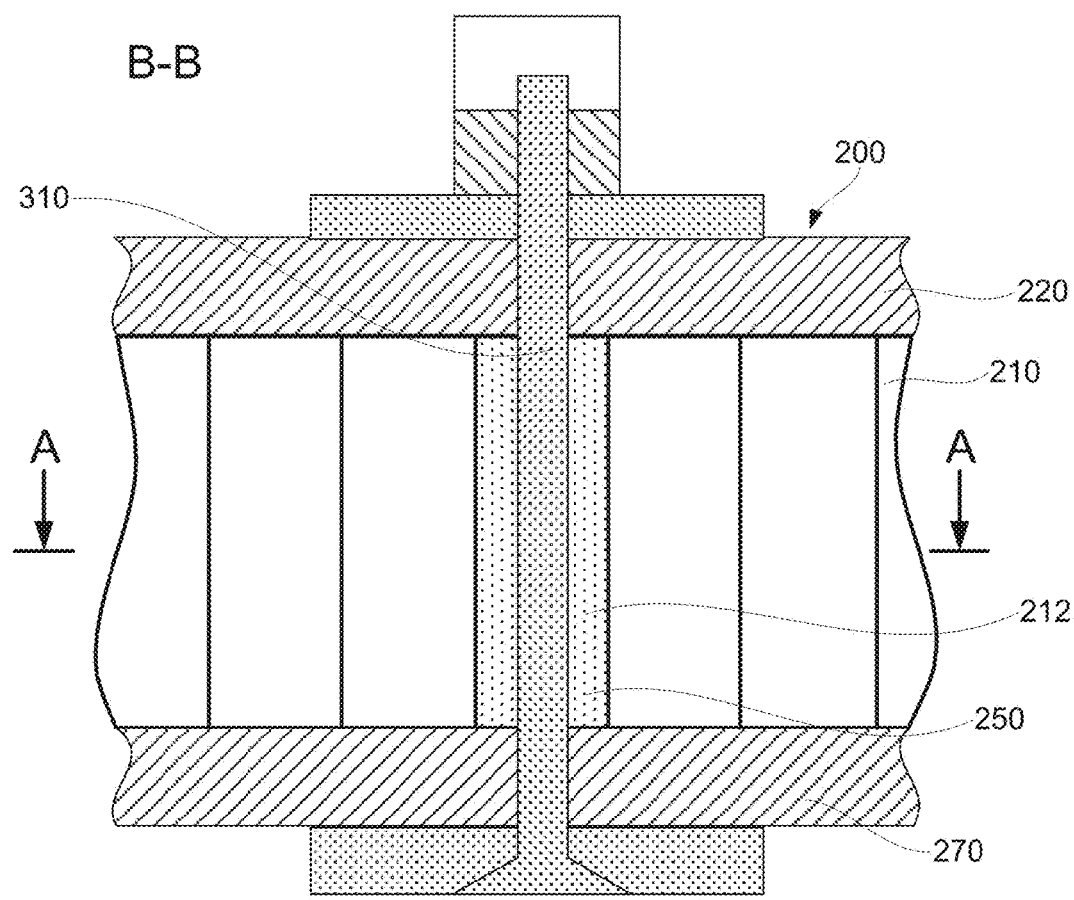
FIGS. 3D-E are schematic cross-sectional views of a stack with a middle part having a honeycomb-type structure and a heat curable material disposed within one cell of this honeycomb-type structure, in accordance with some embodiments.
Figure 3E:
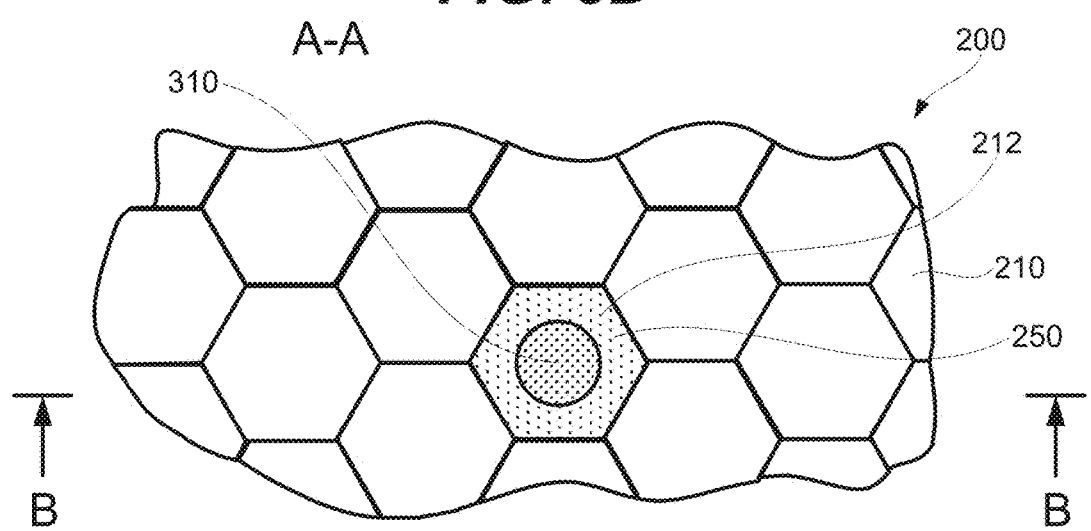

FIGS. 3D and 3E illustrate another example of stack 200 in which first part 210 has a honeycomb-type structure. One having ordinary skill in the art would understand that other types of porous structures and structures with internal voids are also within the scope. First part 210 is disposed between second part 220 and third part 230, which may be solid parts. In this example, cavity 212 may be one cell of the honeycomb-type structure (first structure 210 in this example). In order to access cavity 212 and to supply heat curable material 250 as well as to protrude heating rod 310, an opening may be formed in second part 220. In some embodiments, an additional opening may be formed in third part 230, for example, when heating rod 310 protrudes though entire stack 200 as shown in FIG. 3D. Heat curable material 250 may fill the cell of the honeycomb-type structure as shown in FIGS. 3D and 3E. For example, the top cross-sectional view presented in FIG. 3E shows the profile of this cell being a hexagon. In other words, cavity 212 in this example is a hexagon prism extending throughout the entire thickness of first part 210. Other cross-sectional profiles of cavity 212 are also within the scope, such as a circle, a rectangle, and the like. It should be noted that the cross-sectional profiled of cavity 212 and heating rod 310 may be different. As such, the wall thickness of heat curable material 250 may differ as, for example, shown in FIG. 3E. Alternatively, the wall thickness of heat curable material 250 may be uniform when, for example, both cavity 212 and heating rod 310 have the same cross-sectional shape and are concentric.

Referring to the example shown in FIGS. 3D and 3E, it should be noted that first part 210 may include multiple cavities, e.g., multiple cells of the honey comb structure, and only one of these cavities (in the illustrated example) or a selected group of these cavities may be filled with heat curable material 250. The boundaries of this one or more cavities may define distribution of heat curable material 250 within first part 210.

In some embodiments, cavity 212 may have an irregular shape. For example, first part 210 may be made from a porous materials and when cavity 212 is formed through first part 210 or defined within first part 210 (e.g., one or more cells of the honeycomb structure are identified), some pores may be included into cavity 212 or at least be open for heat curable material 250 to flow into these pores.

Figure 4A:
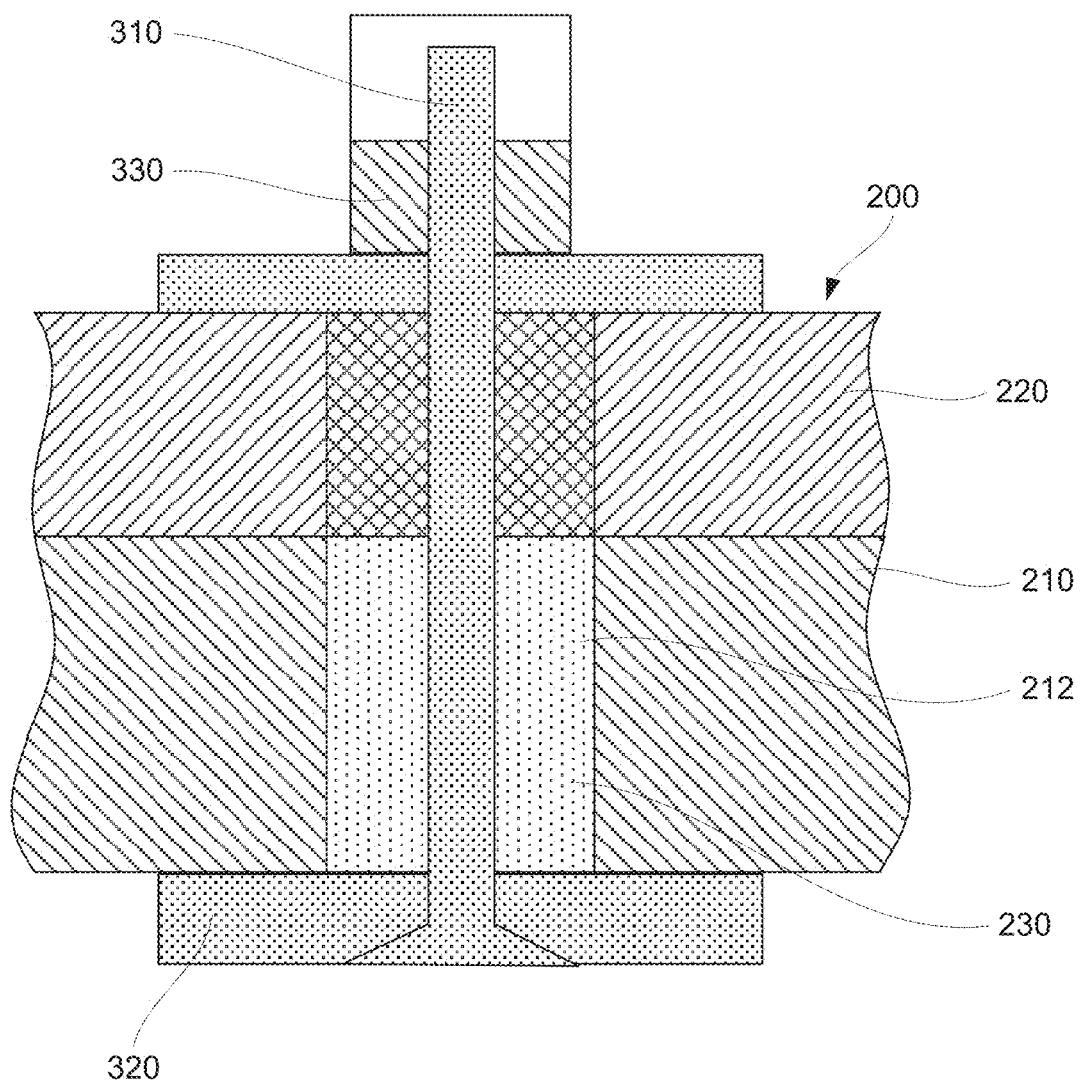
FIG. 4A is a schematic cross-sectional view of a stack with a heating rod protruding through the stack and directly interfacing a heat curable material disposed within a cavity of one part forming the stack, in accordance with some embodiments.

At least one part 210 in these examples of stack 200 may include cavity 212, which later receives heat curable material 250. In some embodiments, heat curable material 250 is disposed in multiple cavities of different parts forming a stack. For example, FIG. 4A illustrates heat curable material 250 disposed in cavity 222 of second part 220 in addition to cavity 212 of first part 210. Alternatively, heat curable material 250 may be restricted to a single part in a stack, e.g., cavity 212 of first part 210. In this example, heat curable material 250 may not be allowed squeeze out into other parts. In other words, cavity 222 of second part 220 stacked with first part 210 may remain free from heat curable material 250 as, for example, shown in FIGS. 2C-2G. In this example, cavity 222 of second part 220 may be used, for example, to access cavity 212 of second part 210 such as protruding heating rod 310, delivering heat curable material 250, and/or other like tasks.

In some embodiments, method 100 involves forming cavity 212 in first part 210 during optional operation 104. Cavity 212 in first part 210 may be formed while forming first part 210 (e.g., forming a honeycomb structure) or using subsequent machining operations, such as drilling, milling, and the like. When both operations 102 and 104 are performed, operation 104 may be performed before or after operation 102. In other words, cavity 212 may be formed in first part 210 prior to stacking it with second part 220 or after.

Method 100 may proceed with thermally coupling heating rod 310 to heat curable material 250 during operation 106. For example, thermal coupling operation 106 may include inserting heating rod 310 into cavity 212 of first part 210 during operation 110 and applying heat curable material 250 into cavity 212 during operation 120. In some embodiments, heating rod 310 protrudes through cavity 212 of first part 210 as, for example, shown in FIG. 2B. When heating rod 310 completely protrudes through first part 210, heating rod 310 may be used to apply compressive force 218 on first part 210 as schematically shown in FIG. 2A. For example, heating rod 310 may be coupled to first support 320 and second support 330 disposed on different sides of first part 210. First support 320 and second support 330 may be able to slid towards each other as further described below with reference to FIGS. 5B and 5C and apply a compressive force onto first part 210. This compressive force may be at least partially transferred to heat curable material 250 and may cause heat curable material 250 to flow into pores and other openings surrounding cavity 212.

Figure 2B:
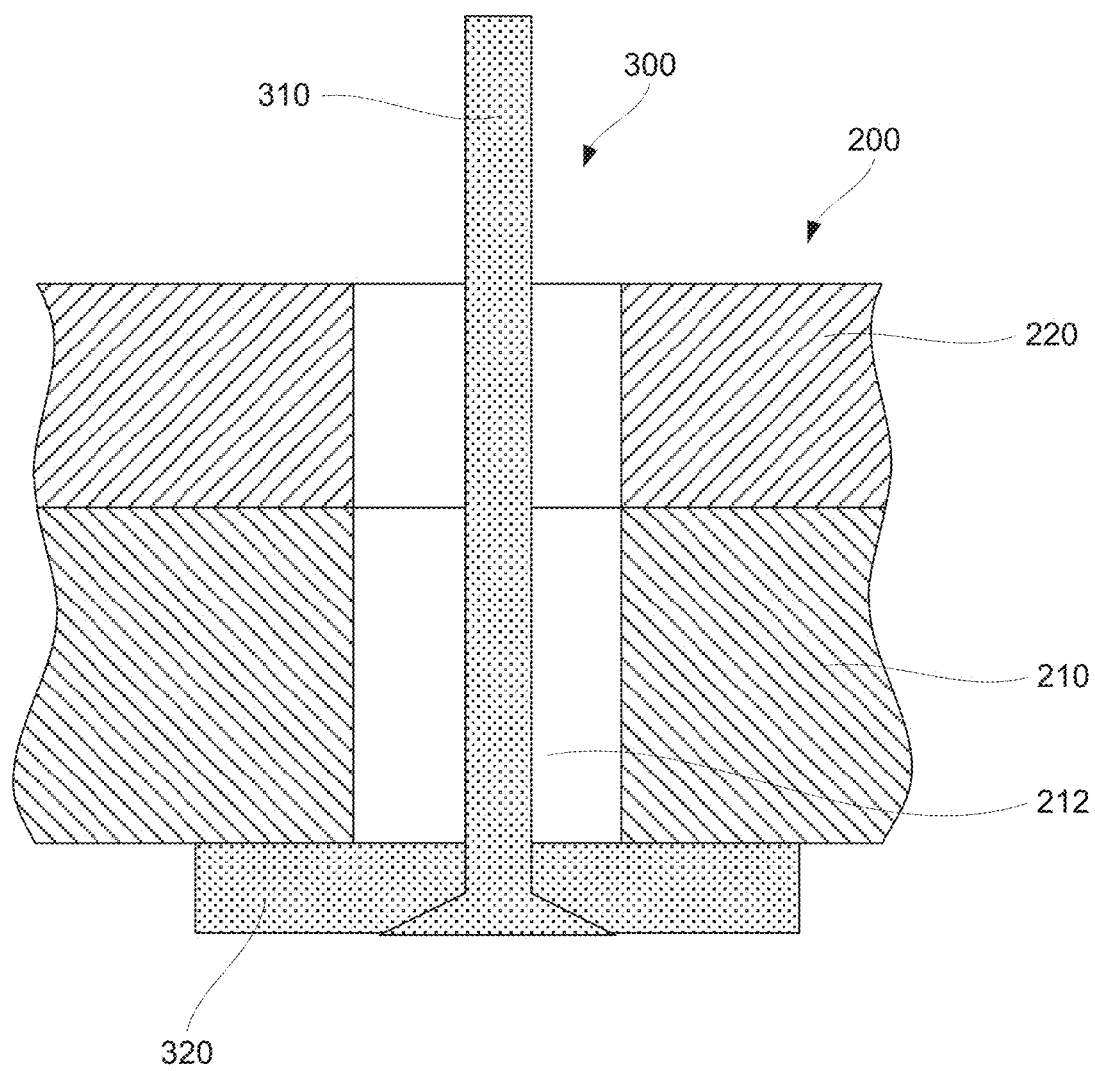
FIG. 2B is a schematic cross-sectional view of the stack shown in FIG. 2A with a heating rod protruding through the cavities, in accordance with some embodiments.
Figure 2C:
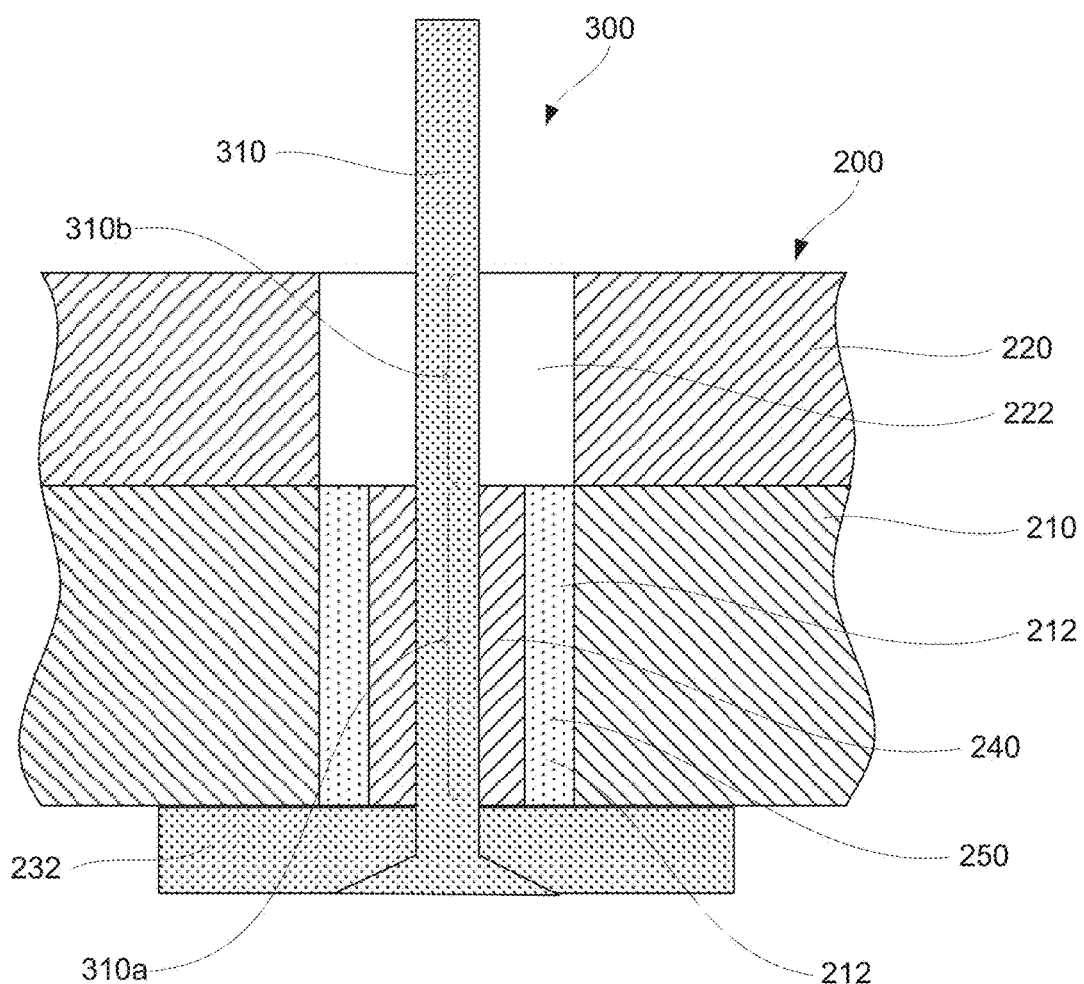
FIG. 2C is a schematic cross-sectional view of the stack shown in FIG. 2A with the heating rod protruding through the cavities and with a heat curable material disposed in one of the cavities, in accordance with some embodiments.

In some embodiments, heating rod 310 may also protrude through second part stacked together with first part 210 as, for example, shown in FIG. 2B. In this example, two parts 210 and 220 may be compressed together by heating rod 310 as schematically shown in FIG. 2E.

Alternatively, heating rod 310 may protrude into cavity 212 without protruding through first part 210 as, for example, shown in FIG. 3C. For example, cavity 212 may be a blind hole. In this example, heating rod 310 may be sealed and even compressed against first part 210 using external means.

In some embodiments, inserting heating rod 310 into cavity 212 of first part 210 during operation 110 also involve sealing at least one end of cavity 212 as, for example, shown in FIG. 2B. For example, first support 320 of curing system 300 may contact first part 210 thereby sealing one end of cavity 212. This sealing may be used to prevent heat curable material 250 from escaping cavity 212 when heat curable material 250 is applied into cavity 212 later. When cavity 212 is a though hole, both ends may be sealed by supports of curing system 300 or by parts surrounding first part 210.

In some embodiments, method 100 further comprises positioning bushing 240 over heating road 310 during optional operation 116. Upon completion of method 100, bushing 240 may be adhered to first part 210 by heat curable material 250. In other words, bushing 240 may remain in stack 200. Alternatively, bushing 240 may be removed from stack 200 (e.g., when removing heating rod 310 or at a later time). Bushing 240 may be formed from a heat conductive material and provide uniform heat distribution to heat curable material 250 transferring heat from heating rod 310 to heat curable material 250.

Figure 2D:
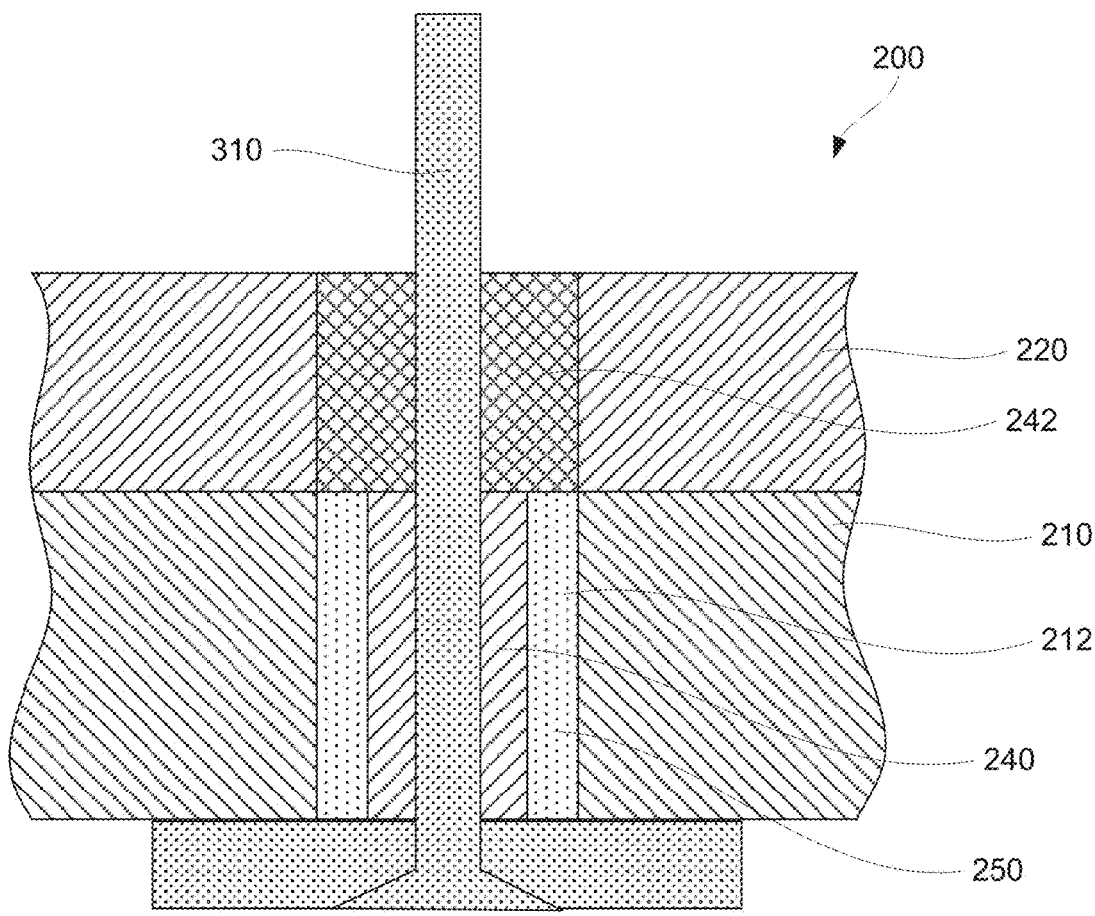
FIG. 2D is a schematic cross-sectional view of the stack shown in FIG. 2C with a bushing disposed in another one of the cavities, in accordance with some embodiments.
Figure 2E:
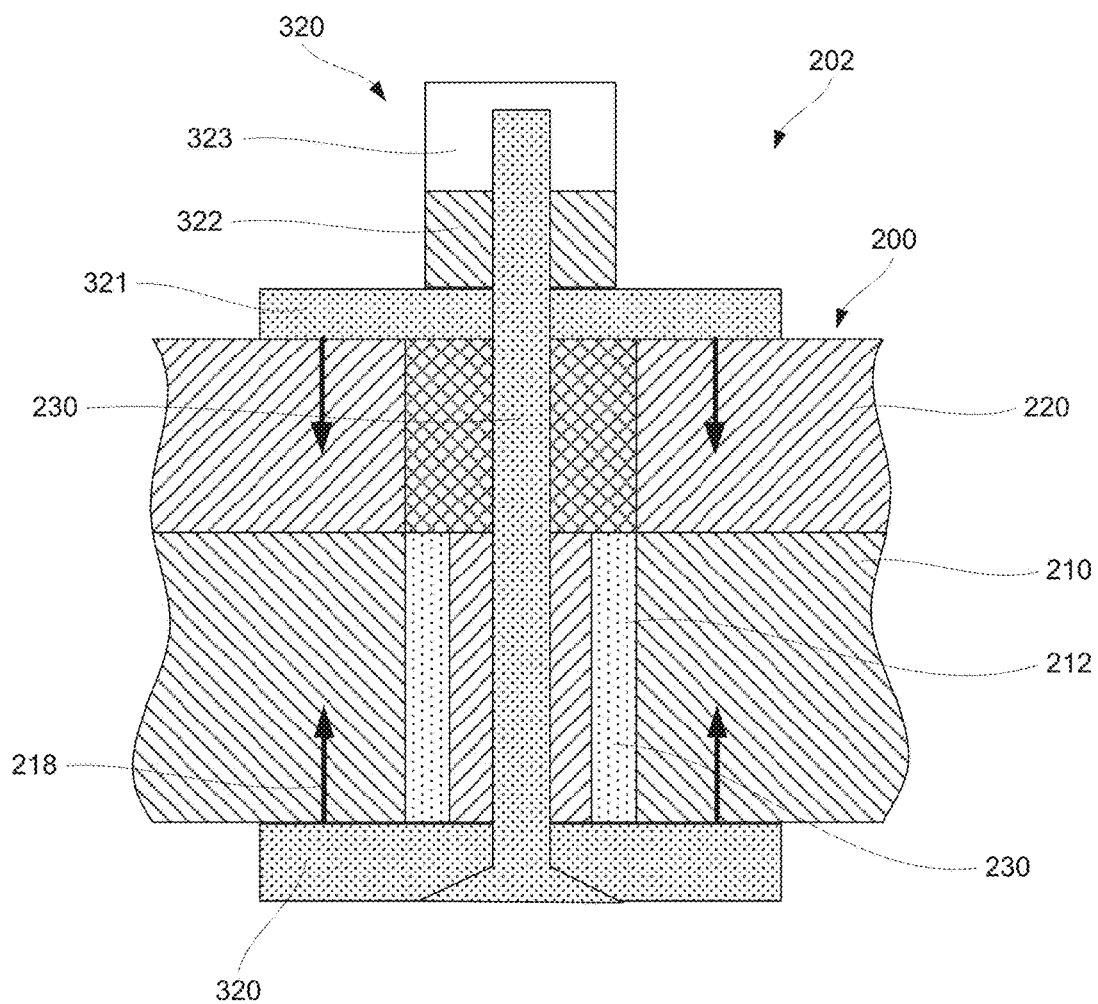
FIG. 2E is a schematic cross-sectional view of the stack shown in FIG. 2D clamped by the heating rod such that the parts are compressed by the heating rod, in accordance with some embodiments.
Figure 2F:
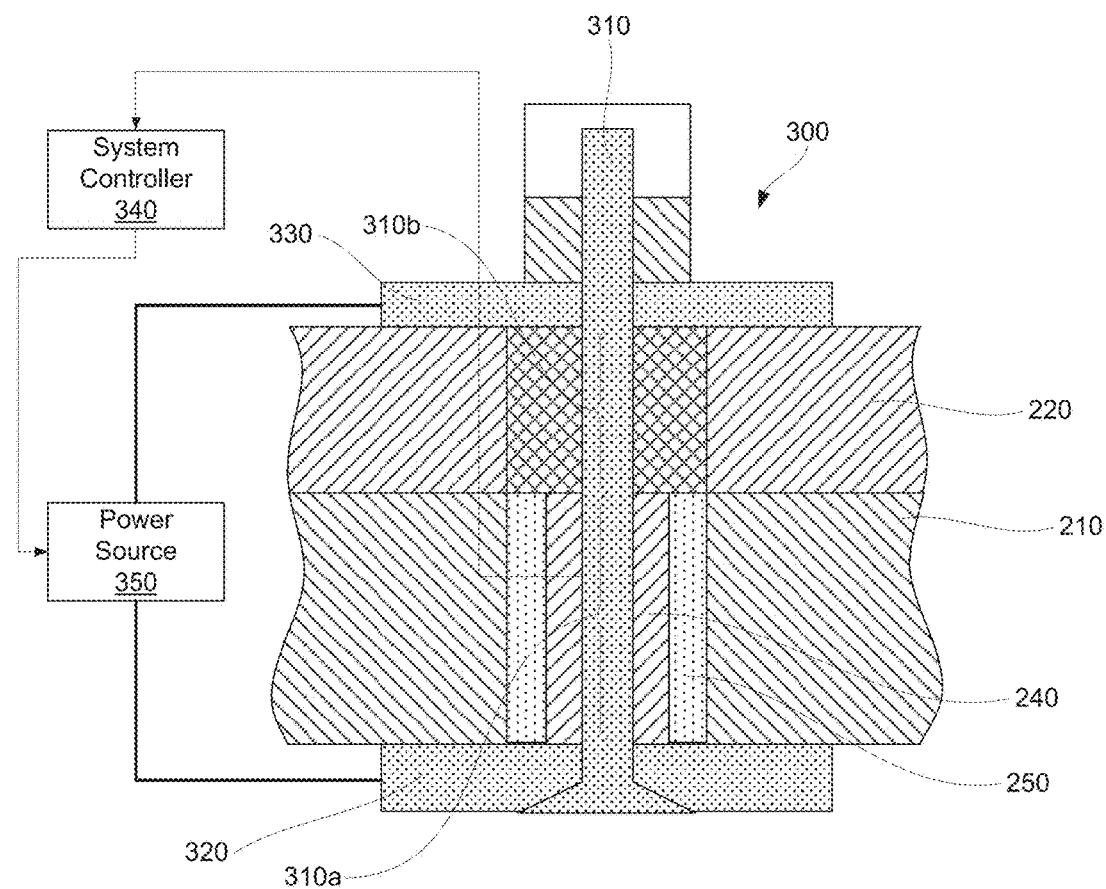
FIG. 2F is a schematic cross-sectional view of the stack shown in FIG. 2E showing power and control components of the curing system, in accordance with some embodiments.
Figure 2G:
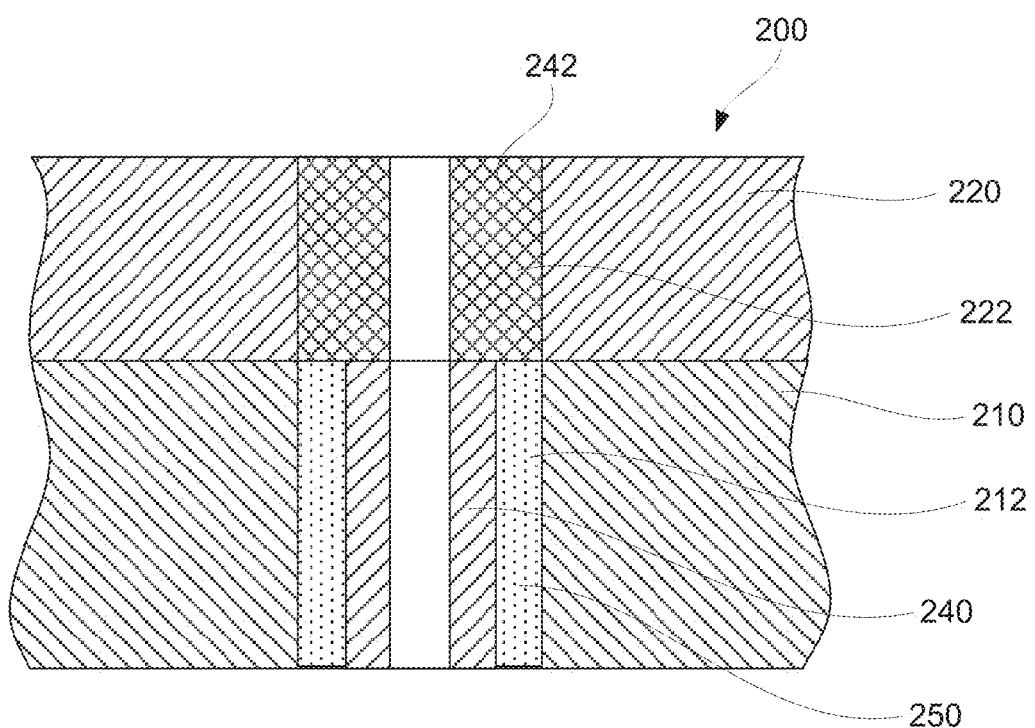
FIG. 2G is a schematic cross-sectional view of the stack shown in FIG. 2E after curing the heat curable material and removing the heating rod from the cavity, in accordance with some embodiments.
Figure 2H:
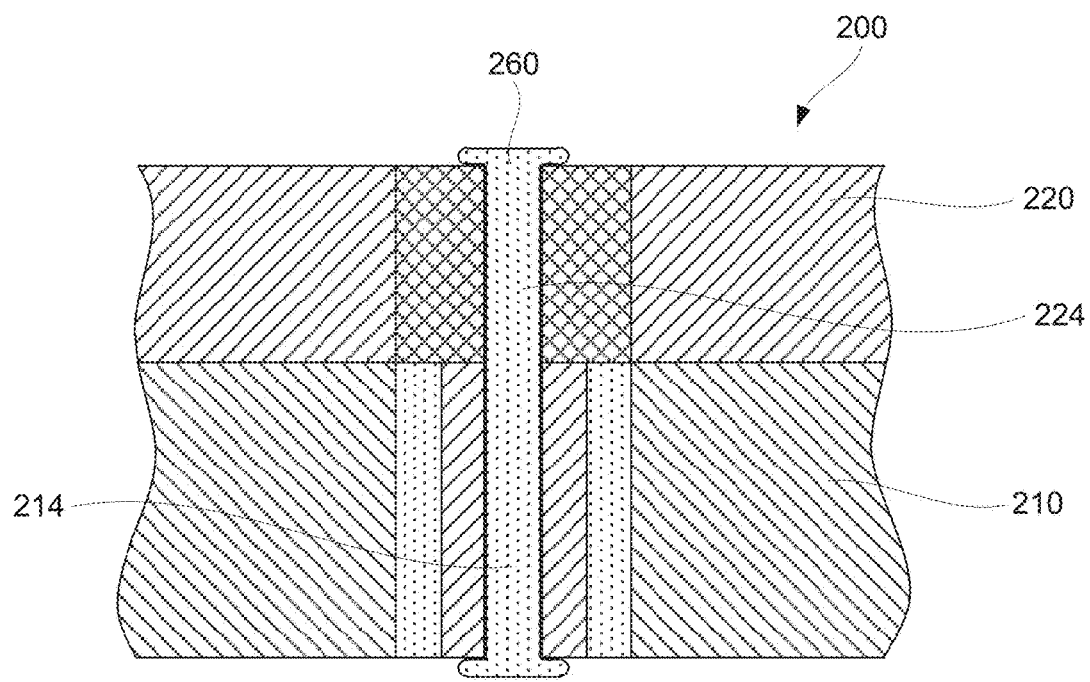
FIG. 2H is a schematic cross-sectional view of the stack shown in FIG. 2G after installing a fastener through the cavity, in accordance with some embodiments.
Figure 2I:
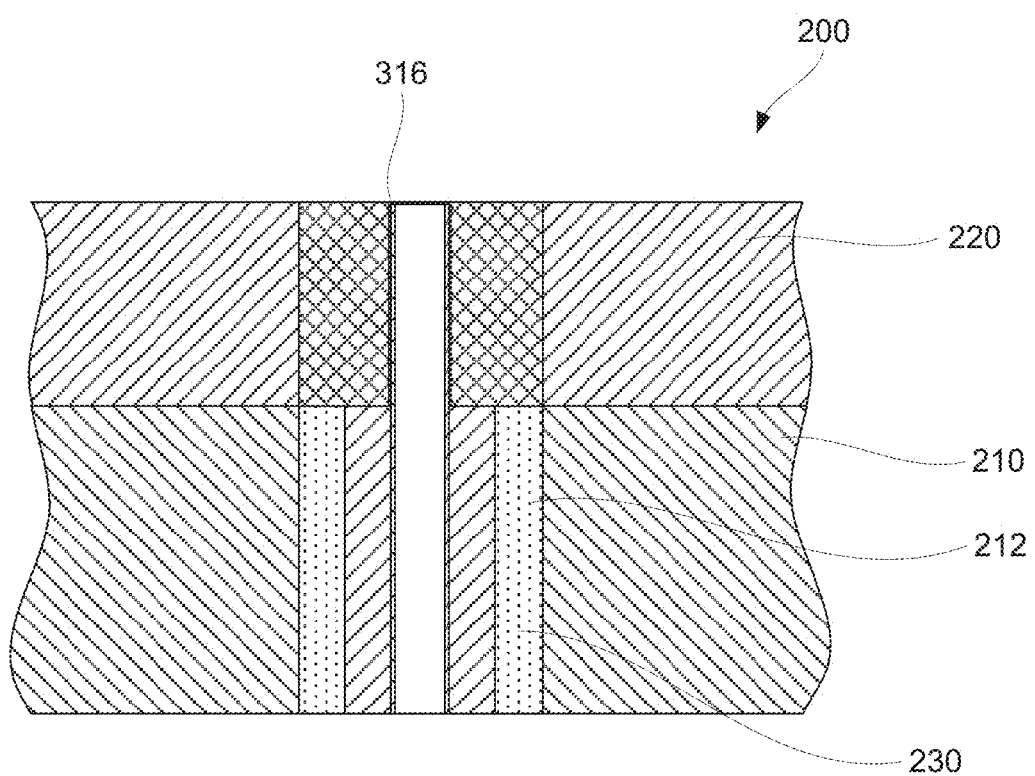
FIG. 2I is a schematic cross-sectional view of the stack shown in FIG. 2G with the sleeve of the heating rod remaining in the cavity, in accordance with some embodiments.
Figure 2J:
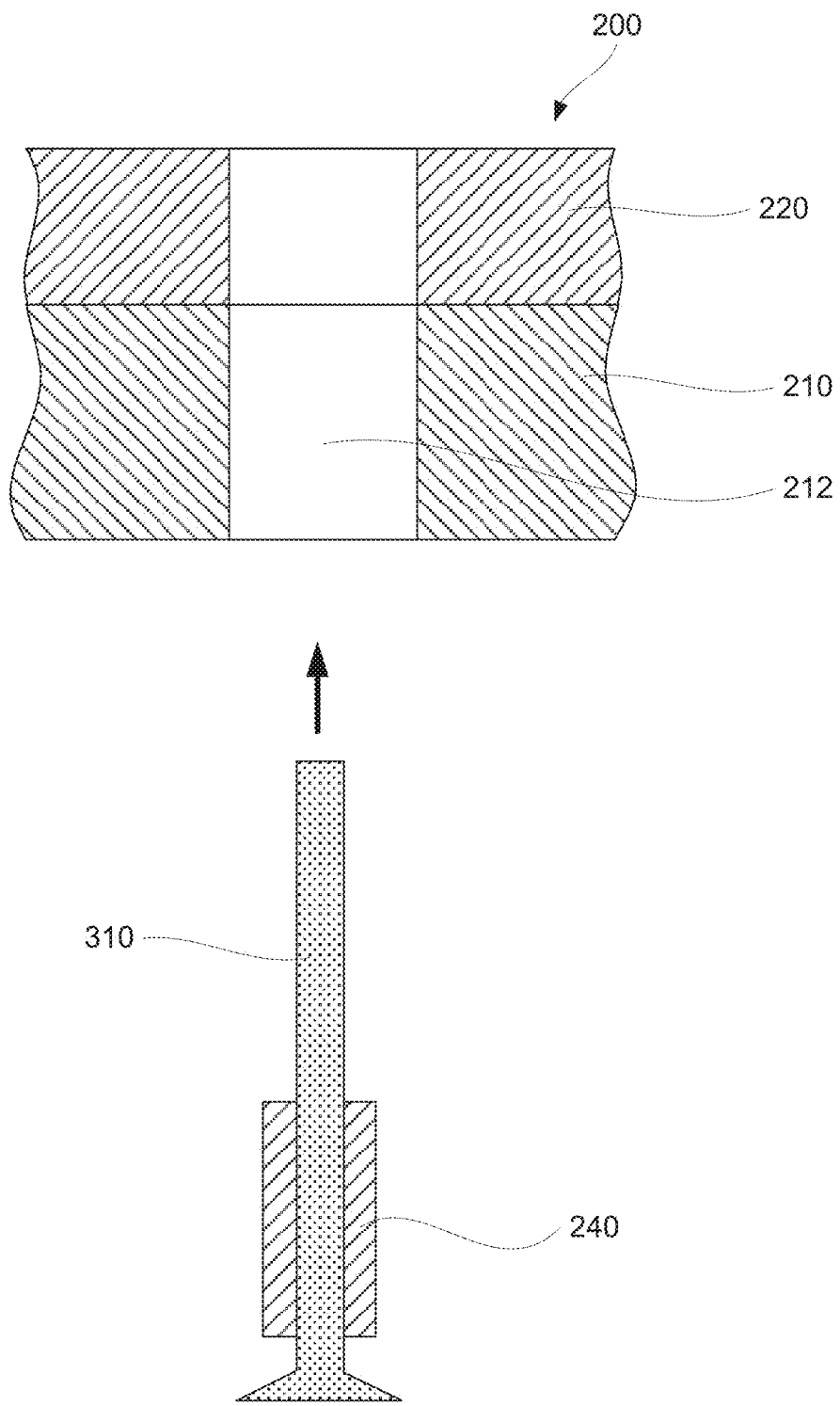
FIG. 2J is a schematic cross-sectional view of the stack shown in FIG. 2A prior to inserting the heating rod into the cavity with a bushing slid over the heating rod, in accordance with some embodiments.

Bushing 240 may be positioned over heating road 310 prior to inserting heating rod 310 into cavity 212 as, for example, schematically shown in FIG. 2J. In other words, operation 116 may be performed prior to operation 110. Alternatively, bushing 240 may be positioned over heating road 310 after inserting heating rod 310 into cavity 212 as, for example, schematically shown by FIGS. 2B-2C. In this case, operation 116 is performed after operation 110. Bushing 240 is optional and may be used for centering of heating rod 310 with respect to stack 210 and/or to provide heat and/or mechanical isolation (e.g., sealing heat curable material 250 within cavity 212). For example, the isolation may be achieved when bushing 240 is placed into a mating part (e.g., second part 220) either above or below (or both sides) of cavity 212 of first part 210, which may be a composite laminate structure being repaired. In some embodiments, bushing 240 is not used.

When bushing 240 is used, bushing 240 may be positioned between heating rod 310 and heat curable material 250 as, for example, shown in FIGS. 2D-2F. It should be noted that bushing is not a part of heating rod 310 or curing system 300. In some embodiments, bushing 240 may not be used and heat curable material 250 may directly interface heating rod 310 as schematically shown in FIG. 4A and further described below.

Method 100 may involve applying heat curable material 250 into cavity 212 of first part 210 during operation 120. For example, heat curable material 250 may be dispensed into cavity 212 using a dispenser or other like means. Heat curable material 250 may be selected from group consisting of a potting compound and an adhesive. Other heat curable materials are also within the scope.

It should be noted that heating rod 310 may be inserted into cavity 212 prior to applying heat curable material 250 into cavity 212. In other words, operation 110 is performed prior to operation 120. This sequence of the operations is shown in FIGS. 2B-2C. In this example, heating rod 310 or, more generally, curing system 300 may be used to seal at least one end of cavity 212 thereby preventing heat curable material 250 from escaping cavity 212 until heat curable material 250 is cured. For example, sealing may help to avoid squeeze out when heat curable material 250 expands during heating or forced into smaller openings around cavity 212 applying the external force to first part 210. Furthermore, migration of heat curable material 250 between different parts (e.g., first part 210 and second 220) may be avoided by sealing heat curable material within cavity 212 of first part 210. Finally, heat curable material 250 may change its viscosity during the overall curing process and may be more susceptible to run out of cavity 212.

Alternatively, heating rod 310 may be inserted into cavity 212 after applying heat curable material 250 into cavity 212. In other words, operation 110 is performed after operation 120. In this example, heating rod 310 may protrude through heat curable material 250 in cavity 212 while being inserted into cavity 212. This operating sequence may be used, for example, to further distribute heat curable material 250 within cavity 212.

Furthermore, heating rod 310 may be inserted into cavity 212 while applying heat curable material 250 into cavity 212. For example, heat curable material 250 may be disposed around heating rod 310 prior to inserting heating rod 310 into cavity. When heating rod 310 is inserted into cavity, heating rod 310 may carry heat curable material 250. In this example, heat curable material 250 may have a high viscosity and even be solid. Heat curable material 250 may be further redistributed within cavity 212 while, for example, transferring heat from heating rod 310 to heat curable material 250. For example, heating of heat curable material 250 may reduce viscosity and help to redistribute heat curable material 250, e.g., heat curable material 250 flows easier when it is heated and its viscosity is reduced.

Figure 4B:
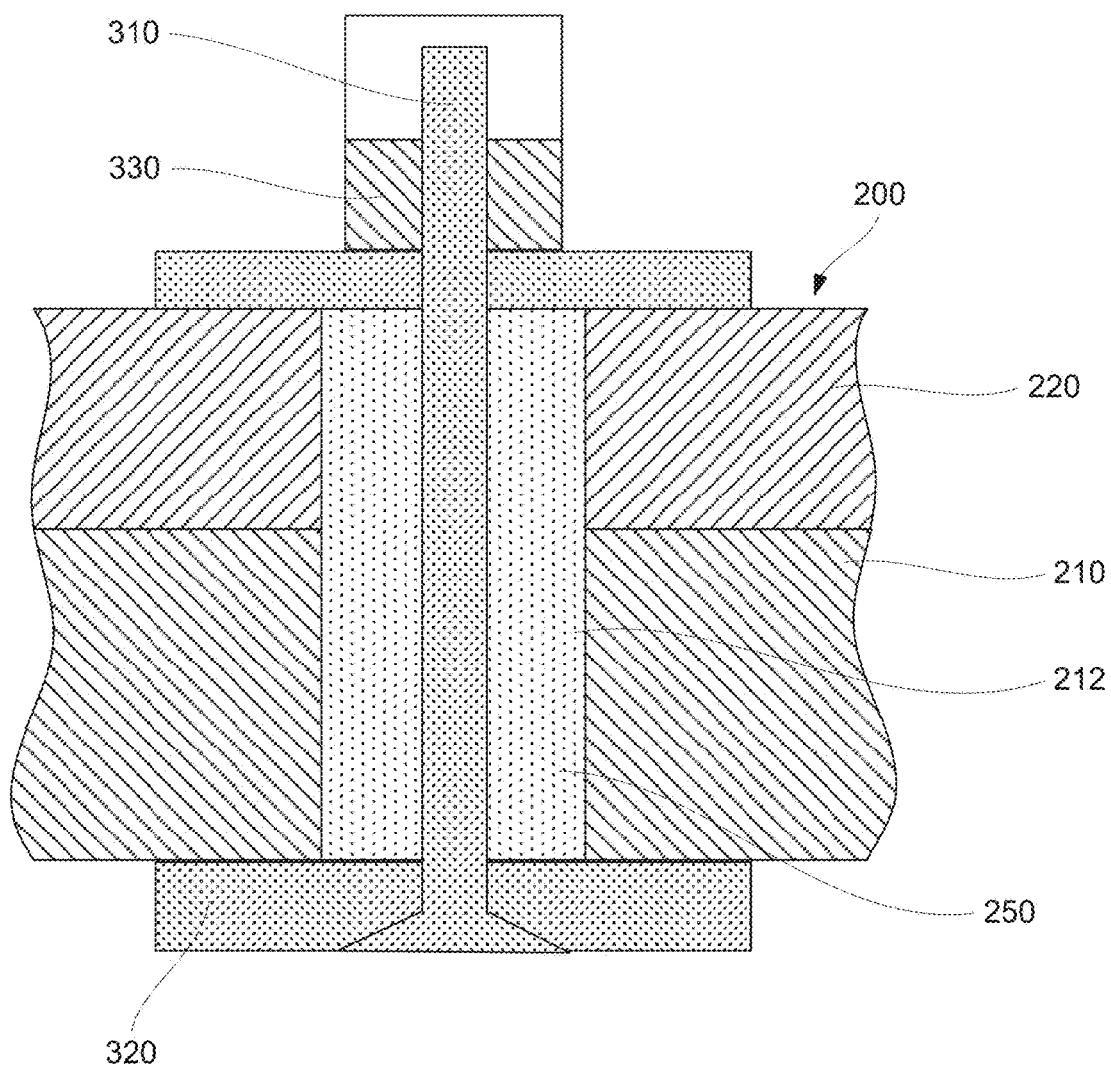
FIG. 4B is a schematic cross-sectional view of a stack with a heating rod protruding through the stack and directly interfacing a heat curable material disposed within cavities of two parts forming the stack, in accordance with some embodiments.

Method 100 may proceed with transferring heat to heat curable material 250 during operation 130. As a result of this heat transfer, heat curable material 250 is cured inside cavity 132 as illustrated by block 132 in FIG. 1. At the time of the heat transfer, heat curable material 250 is thermally coupled to at least portion 310a of heating rod 310 disposed within cavity 212 and supplying the heat to heat curable material 250. This thermal coupling may be established by heat curable material 250 directly interfacing heating rod 310 as, for example, shown in FIGS. 4A-4B. For example, heat curable material 250 may directly interface with coating 315 or sleeve 316 of heating rod 310. In this example, coating 315 or sleeve 316 may be releasable relative to heat curable material 250. Various components of heating rod 310 are described below with reference to FIGS. 6A-6D. Alternatively, the thermal coupling may be established by a heat conductive component disposed between heat curable material 250 and heating rod 310, such as bushing 240 as schematically shown in FIGS. 2D-2F.

When the heat is transferred from heating rod 310 to heat curable material 250, the temperature of heat curable material 250 may increase to between about 150° F. and 250° F. or, more specifically between about 175° F. and 225° F. This temperature may depend on the curing requirements of heat curable material 250 as well as temperature limitations of surrounding parts. This duration may also depend on the curing requirements of heat curable material 250 as well as other factors. Various temperature profiles may be used for curing heat curable material 250. These profiles may require transferring heat from heating rod 310 to heat curable material 250 for a period of time. The heat transfer rate may vary overtime and may be controlled based on the temperature feedback and other factors as further described below.

In some embodiments, transferring heat to heat curable material 250 during operation 130 comprises heating at least portion 310a of heating rod 310 thermally coupled to heat curable material 250 as shown by block 131 in FIG. 1. This heating may be selective heating such that at least another portion 310b of heating rod 310 (referring to FIG. 2F) is not heated. This other portion 310b may be away from heat curable material 250, and it may not be desirable to heat second part 220 proximate to this other portion 310b. As such, only selected portion 310a of heating rod 310 disposed proximate to heat curable material 250 is heated. As further described below with reference to FIG. 6C, heating rod 310 may include heating element 314 which extends only portion 310a of its length 312c. This portion 310a may be thermally coupled to heat curable material 250 while other portions of heating rod 310 may extend beyond the boundary of heat curable material 250.

In some embodiments, heating (block 131 in FIG. 1) of heating rod 310 may be resistive heating (block 134 in FIG. 1). In these embodiments, heating 131 may involve applying a voltage to resistive heating element 314 of heating rod 310. This voltage may vary over times based on different factors as further described below.

In some embodiments, transferring the heat to heat curable material 250 is performed while monitoring the temperature of heat curable material 250 (block 136 in FIG. 1). For example, monitoring the temperature of heat curable material 250 may be performed using heating rod 310. More specifically, heating rod 310 may comprise thermocouple 319. Various aspects of heating rod 310 are further described below with reference to FIGS. 6A-6D. The temperature output of thermocouple 319 may be used to control the amount of heat generated by heating rod 310.

In some embodiments, heating rod 310 comprises phase change material 313 as further described below with reference to FIG. 6. In these embodiments, transferring the heat to heat curable material 250 during operation 130 may involve changing the phase of phase changing material 313 (refer to block 138 in FIG. 1). This phase change phenomenon may be used for controlling the temperature of heat curable material 250. For example, heat curable material 250 may be cured at the phase change temperature. In other words, phase change material 313 is selected such that its phase change temperature coincides with the curing temperature of heat curable material 250. As such, at least the outer surface of heating rod 230 would be at this phase change temperature and remain at this temperature until all of phase change material 313 changes its phase and thus maintain the curing temperature constant until heat curable material 250 is cured. One having ordinary skill in the art would understand that this phase change of heat curable material 250 allows absorbing and releasing some heat by phase changing material 313 while maintaining the constant temperature.

In some embodiments, method 100 comprises cooling one or more parts during optional operation 139. For example, a portion of first part 210 or a portion of second part 220 stacked with first part 210 may be cooled while transferring heat to heat curable material 250 during operation 130. In other words, operation 139 may be a part of operation 130 as reflected in FIG. 1. This cooling may be used to ensure that other parts proximate to heat curable material 250 remain at lower temperature than, for example, the temperature needed for curing heat curable material 250. Cooling may be performed using a portion of heating rod 310 as further described below with reference to FIG. 6C. In the same or other examples, cooling may be performed using components external to the stack.

Method 100 may also involve removing heating rod 310 from cavity 212 during optional operation 140. One example of stack 200 after removing heating rod 310 is schematically shown in FIG. 2G. Heat curable material 250 is cured at this stage of method 100. If bushing 240 is used, bushing 240 may remain in stack 200. FIG. 2G also illustrates additional bushing 242 inserted in cavity 222 of second part 220. The space previously occupied by heating rod 310 may be used to install a fastener or other purposes as further described below.

In some embodiments, heating rod 310 comprises sleeve 316 disposed over enclosure 312 of heating rod 310. Various aspects of sleeve 316 are described below with reference to FIG. 6A. Sleeve 316 may be retained in cavity after removing heating rod 310 from cavity 212 during operation 140 as schematically shown in FIG. 2I. For example, sleeve 316 may be used to simplify removal operation 140. In some embodiments, friction between sleeve 316 and enclosure 312 may be less than between sleeve 316 and heat curable material 250, which has been cured at this point. In these embodiments, method 100 may further comprise removing sleeve 316 from cavity 212 during operation 150. Sleeve 316 may be easier to remove from cavity 212 after removal of heating 310 as additional space is available inside sleeve 316. Alternatively, sleeve 316 may be retained in cavity 212 and may be become a part of stack 200 together with first part 210.

In some embodiments, after removing heating rod 310 from cavity 212, method 100 may proceed with installing fastener 260 into cavity 212 of first part 210 during optional operation 160. FIG. 2H is a schematic illustration of stack 200 after installing fastener 260 through the space previously occupied by heating rod 310. Fastener 260 may extend through first part 210 and second part 220 and, in some embodiments, compress parts 210 and 220 together. Some examples of fastener 260 include but are not limited to a rivet, bolt, an insert, or a fastener device/mechanism.

System Examples

Figure 5A:
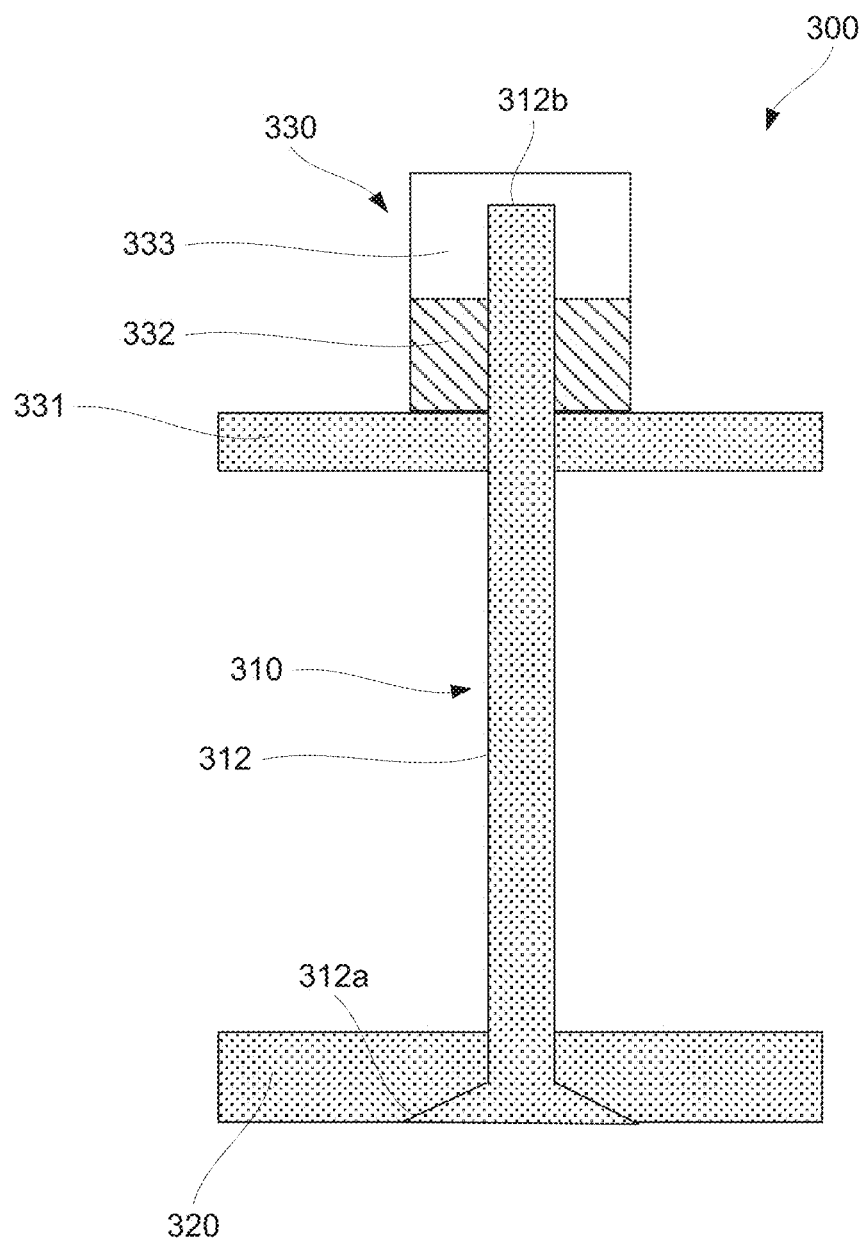
FIG. 5A is a schematic view of a curing system, in accordance with some embodiments.
Figures 5B, 5C:
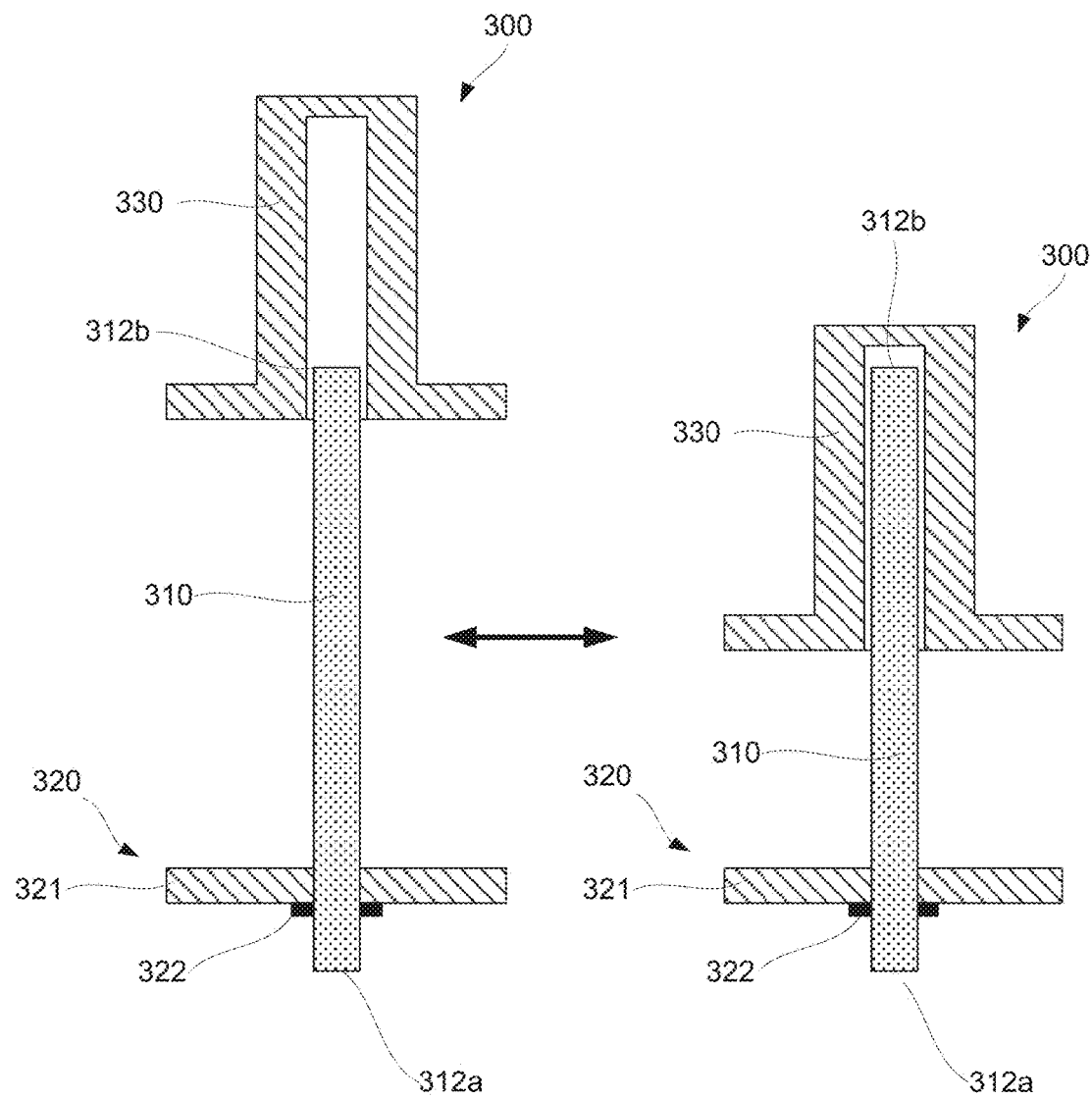
FIGS. 5B-5C are schematic views of another example of a curing system in its two states, in accordance with some embodiments.

FIG. 5A is an example of curing system 300 comprising heating rod 310, first support 320, and second support 330. First support 320 engages enclosure 312 of heating rod 310. Second support 330 also engages enclosure 312 of heating rod 310. Second support 330 may be movable between first end 312a and second end 312b of enclosure 312 while continuously engaging enclosure 312 of heating rod 310 as, for example, in schematically illustrated in FIGS. 5B and 5C. In some embodiments, both first support 320 and second support 330 are movable. This movement may be used for sealing first part 210 and, in some embodiments, for compressing first part 210, e.g., against second part 220. Compression force 218 may be generated by a mechanical means, pneumatic means, hydraulic means, and the like. For example, second support 330 may include nut 332 threadably coupled to enclosure 312 of heating rod 310. In some embodiments, second support 330 also includes insulator 333 and washer 331. For example, when washer 331 may be pressed by nut 332 against a part.

Figure 6A:
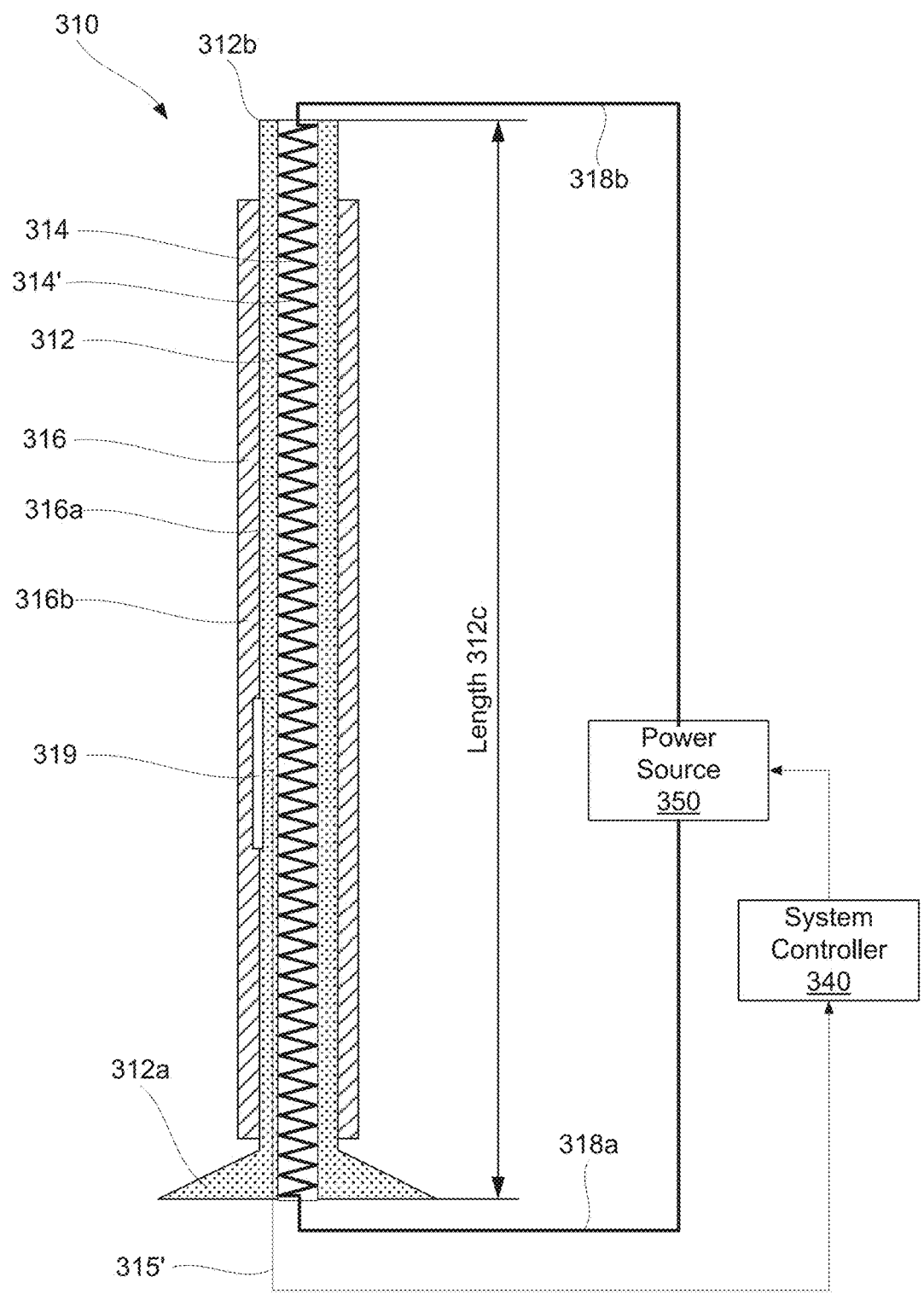
FIG. 6A is a schematic cross-sectional view of a heating rod illustrating internal components of that rod, in accordance with some embodiments.

FIG. 6A illustrate internal components of heating rod 310. For example, heating rod 310 may comprise heating element 314 and enclosure 312 enclosing heating element 314. Heating rod 310 may include first electrical lead 318a connected to heating element 314 and second electrical lead 318b also connected to heating element 314. Heating element 314 of heating rod 310 may be a resistive heating element. First electrical lead 318a connected to heating element 314 and second electrical lead 318b may be used to apply a voltage to heating element 314 thereby driving an electrical current through heating element 314.

In some embodiments, first electrical lead 318a extends from first end 312a of enclosure 312, while second electrical lead 318b extends from second end 312b of enclosure 312 different from first end 312a as, for example, schematically shown in FIG. 6A. Alternatively, first electrical lead 318a and second electrical lead 318b both extend from same end, e.g., first end 312a, of enclosure 312 as, for example, schematically shown in FIG. 6A.

In some embodiments, curing system 300 also comprises thermocouple 319 as, for example, shown in FIG. 6A. Thermocouple 319 may be used for measuring temperature of enclosure 312. The output of thermocouple 319 may be used to control electrical power supplied to heating element 314 of heating rod 310. For example, curing system 300 may also comprise system controller 340 as shown in FIG. 6A. System controller 340 is communicatively coupled to thermocouple 319. More specifically, the output of thermocouple is received by system controller 340. This output is used by system controller 340 to determine the electrical power supplied to heating element 314. As shown in FIG. 6A, system controller 340 may be communicatively coupled to power source 350, which is connected to first electrical lead 318a and second electrical lead 318b. System controller 340 may instruct power source 350 about the level of power supplied to heating element 314 through first electrical lead 318a and second electrical lead 318b.

In some embodiments, heating rod 310 also comprises sleeve 316 disposed over enclosure 312 as, for example, is shown in FIG. 6A. Enclosure 312 and sleeve 316 comprise different materials. For example, sleeve 316 may comprise polymer 316a, such as a fluorinated polymer 316b. Enclosure 312 may be metal. Sleeve 316 may be removable and may slide of enclosure 312 when heating rod 310 is removed from cavity 212 after heat curable material 250 is cured.

Figure 6B:
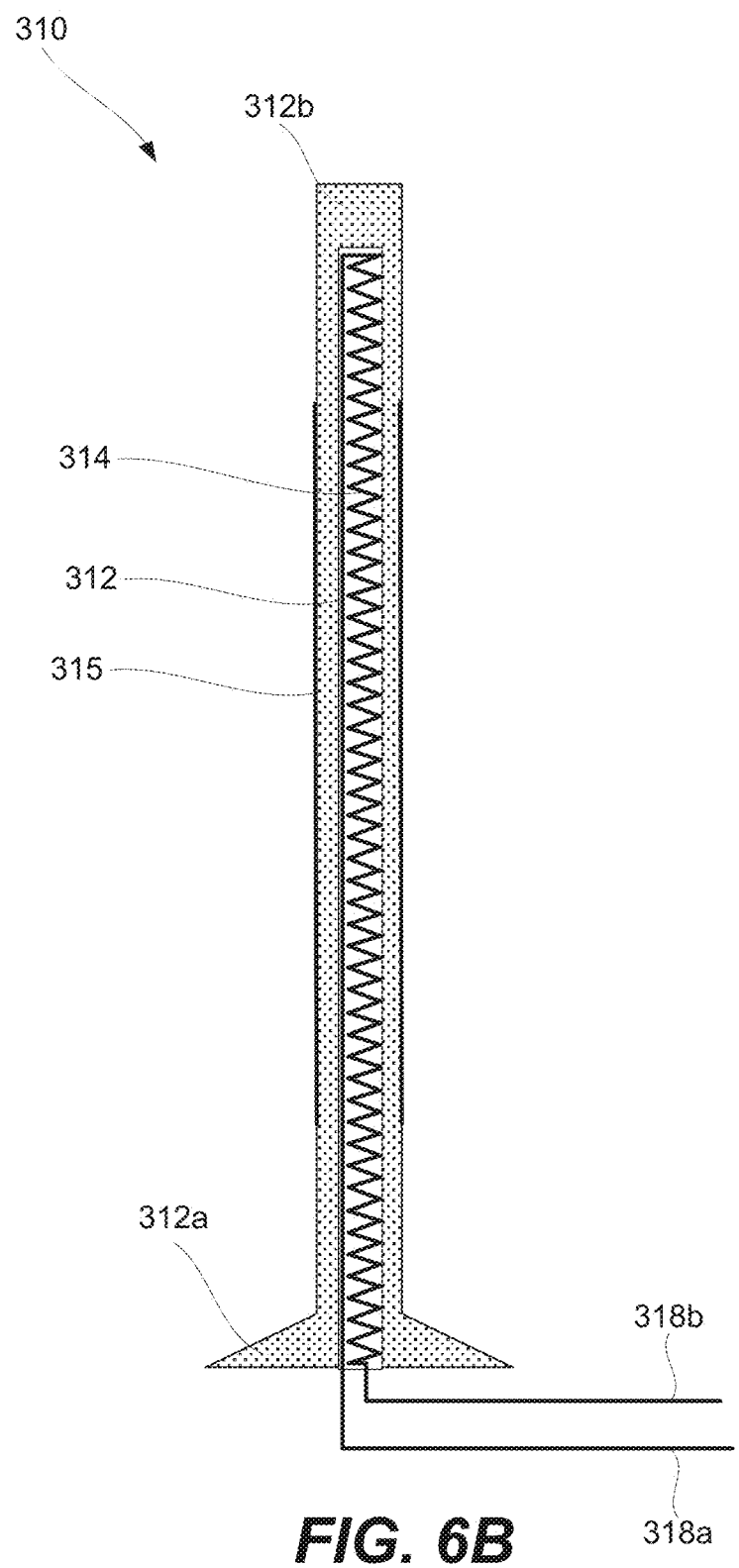
FIG. 6B is a schematic cross-sectional view of another example of a heating rod, in accordance with some embodiments.

In some embodiments, heating rod 310 may comprise coating 315 disposed on enclosure 312 as, for example, is schematically shown in FIG. 6B. Enclosure 312 and coating 315 may comprise different materials. In some embodiments, coating 315 is used in addition to sleeve 316, e.g., to assist with the removal of sleeve 316. Alternatively, coating 315 may be used instead of sleeve 316.

Figure 6C:
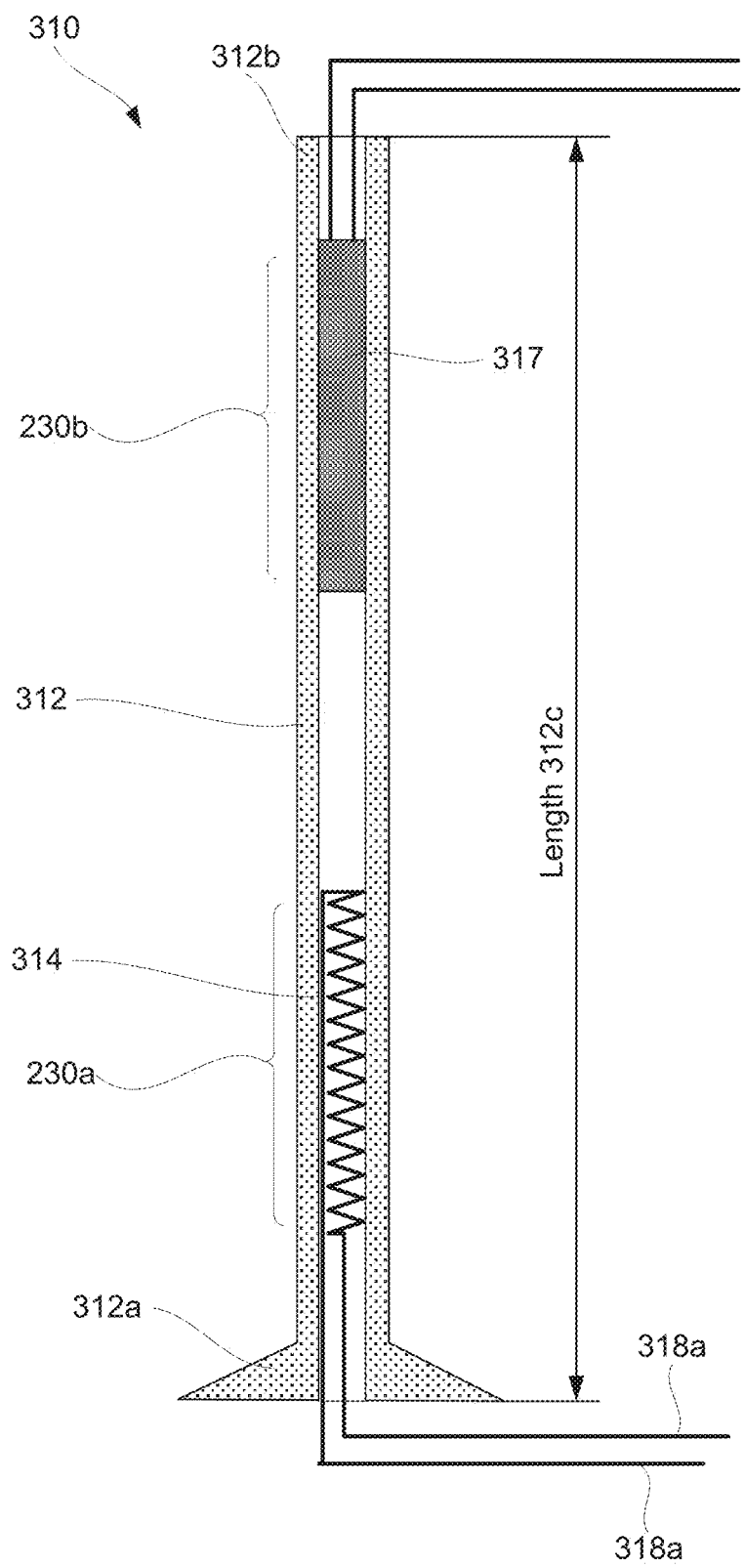
FIG. 6C is a schematic cross-sectional view of yet another example of a heating rod, in accordance with some embodiments.

Heating element 314 may extend less than 75% of a length 312c of enclosure 232 or, more specifically, less than less than 50% of length 312c as schematically shown in FIG. 6C. This aspect helps with selective heating. For example, the location and dimension of heating element 314 may correspond to portion 310a of heating rod 310 thermally coupled to heat curable material 250. As such, not all parts contacting heating rod 310 are being heated. In some embodiments, heating element 314 of heating rod 310 is resistive heating element 314'.

Figure 6D:
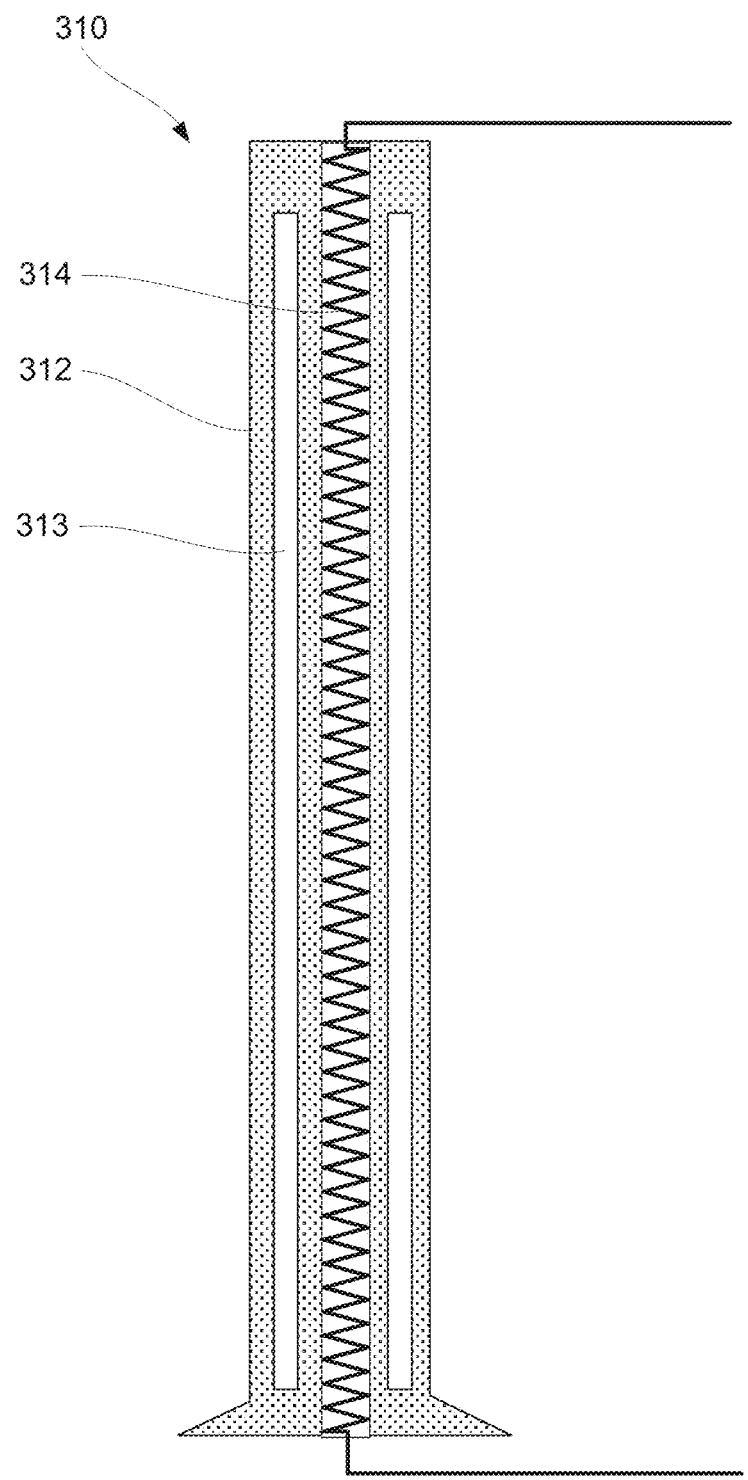
FIG. 6D is a schematic cross-sectional view a heating rod having a phase change material disposed within its enclosure, in accordance with some embodiments.

In some embodiments, curing system 300 comprises phase change material 313. For example, phase change material 313 may be disposed within enclosure 312 as schematically shown in FIG. 6D. As described above, phase change material 313 helps with the temperature control when transferring the heat from heating rod 310 to heat curable material 250.

In some embodiments, heating rod 310 further comprises cooling element 317. For example, cooling element 317 may be disposed within enclose 312 as, for example, schematically shown in FIG. 6C. The location and size of cooling element 317 may be selected based on one or more parts that are thermally coupled to heating rod 310 but that may not be thermally stable.

Examples of Aircraft and Methods of Fabricating and Operating Aircraft

Figure 7:
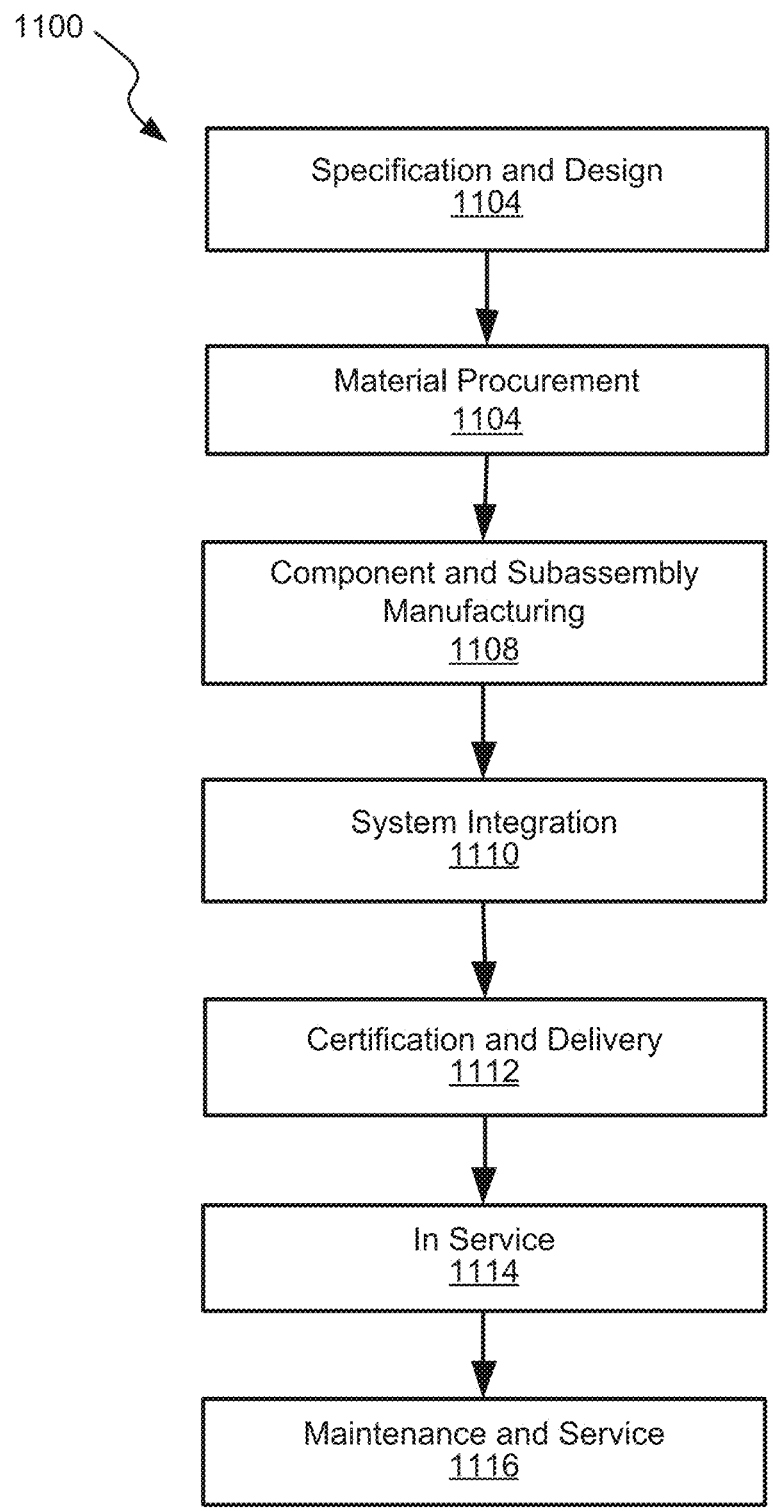
FIG. 7 is a block diagram of aircraft production and service methodology that may utilize methods and assemblies described herein.
Figure 8:
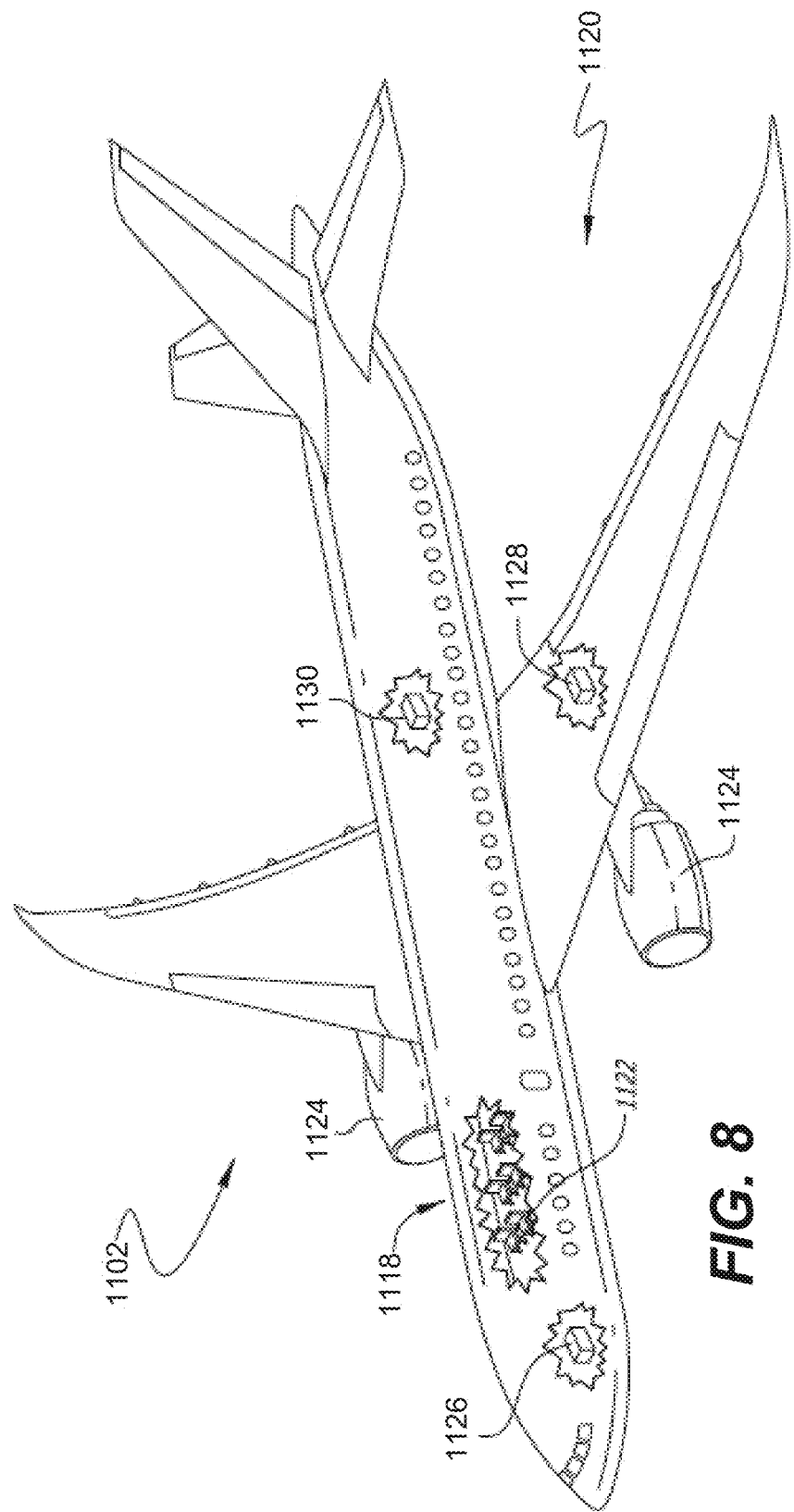
FIG. 8 is a schematic illustration of an aircraft that may include methods and assemblies described herein

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Described methods and systems formed by these methods, such as methods of curing heat curable materials inside cavities, can be used in any of specification and design (block 1104) of aircraft 1102, material procurement (block 1106), component and subassembly manufacturing (block 1108), and/or inspection system integration (block 1110) of aircraft 1102.

Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc, of one or more inspection systems of aircraft 1102. Described methods and systems formed by these methods, such as methods of curing heat curable materials inside cavities, can be used in any of certification and delivery (block 1112), service (block 1114), and/or routine maintenance and service (block 1116).

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level inspection systems 1120 and interior 1122. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of curing a heat curable material disposed within a cavity of a first part, the method comprising:
thermally coupling a heating rod and the heat curable material, wherein the heat curable material is disposed within the cavity of the first part prior to thermally coupling the heating rod to the heat curable material;
transferring heat from the heating rod to the heat curable material while the heat curable material is disposed within the cavity and thermally coupled to the heating rod; and
changing a phase of a phase changing material disposed within the heating rod thereby controlling a temperature of the heat curable material while transferring the heat from the heating rod to the heat curable material.

2. The method of claim 1, wherein transferring the heat from heating rod to the heat curable material cures the heat curable material.

3. The method of claim 1, wherein thermally coupling the heating rod and the heat curable material comprises:
inserting the heating rod into the cavity, and
applying the heat curable material into the cavity.

4. The method of claim 1, wherein transferring the heat from the heating rod to the heat curable material comprises heating at least a portion of the heating rod thermally coupled to the heat curable material.

5. The method of claim 1, further comprising cooling a portion of the first part or a portion of a second part stacked with the first part while transferring the heat to the heat curable material.

6. The method of claim 5, wherein cooling the portion of the first part or the portion of the second part stacked with the first part is performed while transferring the heat from the heating rod to the heat curable material.

7. The method of claim 1, wherein transferring the heat to the heat curable material is performed while monitoring a temperature of the heat curable material.

8. The method of claim 1, wherein the heat curable material directly interfaces the heating rod while transferring the heat from the heating rod to the heat curable material.

9. The method of claim 1, wherein the heating rod comprises a heating element and an enclosure enclosing the heating element.

10. The method of claim 9, wherein the heating rod further comprises a coating disposed on the enclosure, wherein the enclosure and the coating comprises different materials.

11. The method of claim 9, wherein the heating rod further comprises a sleeve disposed over the enclosure, wherein the enclosure and the sleeve comprises different materials.

12. The method of claim 11, further comprising removing the heating rod from the cavity after the heat curable material is cured, wherein the sleeve is retained in the cavity after removing the heating rod from the cavity.

13. The method of claim 1, wherein the heating rod protrudes through the first part.

14. The method of claim 13, wherein the heating rod applies a compressive force on the first part.

15. The method of claim 13, wherein the heating rod protrudes through a second part stacked together with the first part.

16. The method of claim 15, wherein the first part is porous, and wherein the second part seals the heat curable material within a boundary of the first part.

17. The method of claim 16, wherein the first part has a honeycomb structure, and wherein the cavity is a pore in the honeycomb structure.

18. The method of claim 15, wherein an additional portion the heating rod protruding through the second part does not generate heat while transferring the heat to the heat curable material.

19. A method of curing a heat curable material within a cavity of a first part, the method comprising:
thermally coupling a heating rod and the heat curable material, wherein the heat curable material is disposed within the cavity of the first part prior to thermally coupling the heating rod to the heat curable material;
transferring heat from the heating rod to the heat curable material while the heat curable material is disposed within the cavity and thermally coupled to the heating rod,
wherein the heating rod comprises a heating element, an enclosure enclosing the heating element, and a sleeve disposed over the enclosure, and
wherein the enclosure and the sleeve comprises different materials,
removing the heating rod from the cavity after the heat curable material is cured, wherein the sleeve is retained in the cavity after removing the heating rod from the cavity; and
removing the sleeve from the cavity.

20. The method of claim 19, further comprising changing a phase of a phase changing material disposed within the heating rod thereby controlling a temperature of the heat curable material while transferring the heat from the heating rod to the heat curable material.

* * * * *